(12) United States Patent
Ayatsuka

(10) Patent No.: US 7,505,768 B2
(45) Date of Patent: Mar. 17, 2009

(54) COMMUNICATION SYSTEM AND METHOD, INFORMATION PROCESSING TERMINAL AND METHOD, INFORMATION PROCESSING APPARATUS AND METHOD

(75) Inventor: Yuji Ayatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/494,028

(22) PCT Filed: Oct. 28, 2002

(86) PCT No.: PCT/JP02/11167

§ 371 (c)(1),
(2), (4) Date: Apr. 28, 2004

(87) PCT Pub. No.: WO03/038629

PCT Pub. Date: May 8, 2003

(65) Prior Publication Data

US 2004/0259539 A1 Dec. 23, 2004

(30) Foreign Application Priority Data

Nov. 1, 2001 (JP) ............................. 2001-336535

(51) Int. Cl.
*H04Q 7/20* (2006.01)
(52) U.S. Cl. .................................. 455/432.3; 455/436
(58) Field of Classification Search ................ 455/410, 455/411, 41, 414.1, 432.3; 370/331, 338
See application file for complete search history.

(56) References Cited

U.S. PATENT DOCUMENTS 5,958,006 A 9/1999 Eggleston et al.
6,396,612 B1 * 5/2002 Bjorndahl .................. 398/121
6,968,178 B2 * 11/2005 Pradhan et al. .......... 455/414.1

(Continued)

FOREIGN PATENT DOCUMENTS

CN 1223537 A 7/1999

(Continued)

OTHER PUBLICATIONS

Chinese Office Action mailed by the Chinese Patent Office on Jan. 26, 2007 in a counterpart Chinese application.

*Primary Examiner*—George Eng
*Assistant Examiner*—Michael Faragalla
(74) *Attorney, Agent, or Firm*—Finnegan, Henderson, Farabow, Garrett & Dunner, L.L.P.

(57) ABSTRACT

The present invention relates to a communication system and method, an information processing terminal and method, and an information processing apparatus and method which enable very suitable confirmation of details of an operation. In a PDA 11, an exterior image of a terminal is prepared as characteristic information representing characteristics of the PDA 11. Also, in the PDA 11, communication establishing information for establishing predetermined wireless communication with a personal computer 1 is prepared, and a built-in reader/writer 12 transmits both types of information to a reader/writer 2 of the personal computer 1. The personal computer 1 establishes wireless communication with the PDA 11 based on the communication establishing information, and controls a display unit 3 to display an exterior image of the PDA 11 based on the characteristic information while performing the establishing processing. The present invention can be applied to various types of information processing apparatuses such as personal computers and PDAs.

10 Claims, 19 Drawing Sheets

U.S. PATENT DOCUMENTS

| | | | |
|---|---|---|---|
| 2002/0123325 A1* | 9/2002 | Cooper | 455/411 |
| 2002/0128010 A1 | 9/2002 | Uda | |
| 2003/0025738 A1* | 2/2003 | Polgar et al. | 345/835 |
| 2004/0127218 A1 | 7/2004 | Paik et al. | |

FOREIGN PATENT DOCUMENTS

| | | |
|---|---|---|
| CN | 1291018 A | 4/2001 |
| EP | 756397 A2 * | 1/1997 |
| EP | 0 893 760 | 1/1999 |
| JP | 7-295903 | 11/1995 |
| JP | 11-120205 | 4/1999 |
| JP | 2001-142825 | 5/2001 |
| JP | 2001-145181 | 5/2001 |
| JP | 2001-156704 | 6/2001 |
| WO | WO 01 69903 | 9/2001 |
| WO | WO 01 78325 | 10/2001 |

* cited by examiner

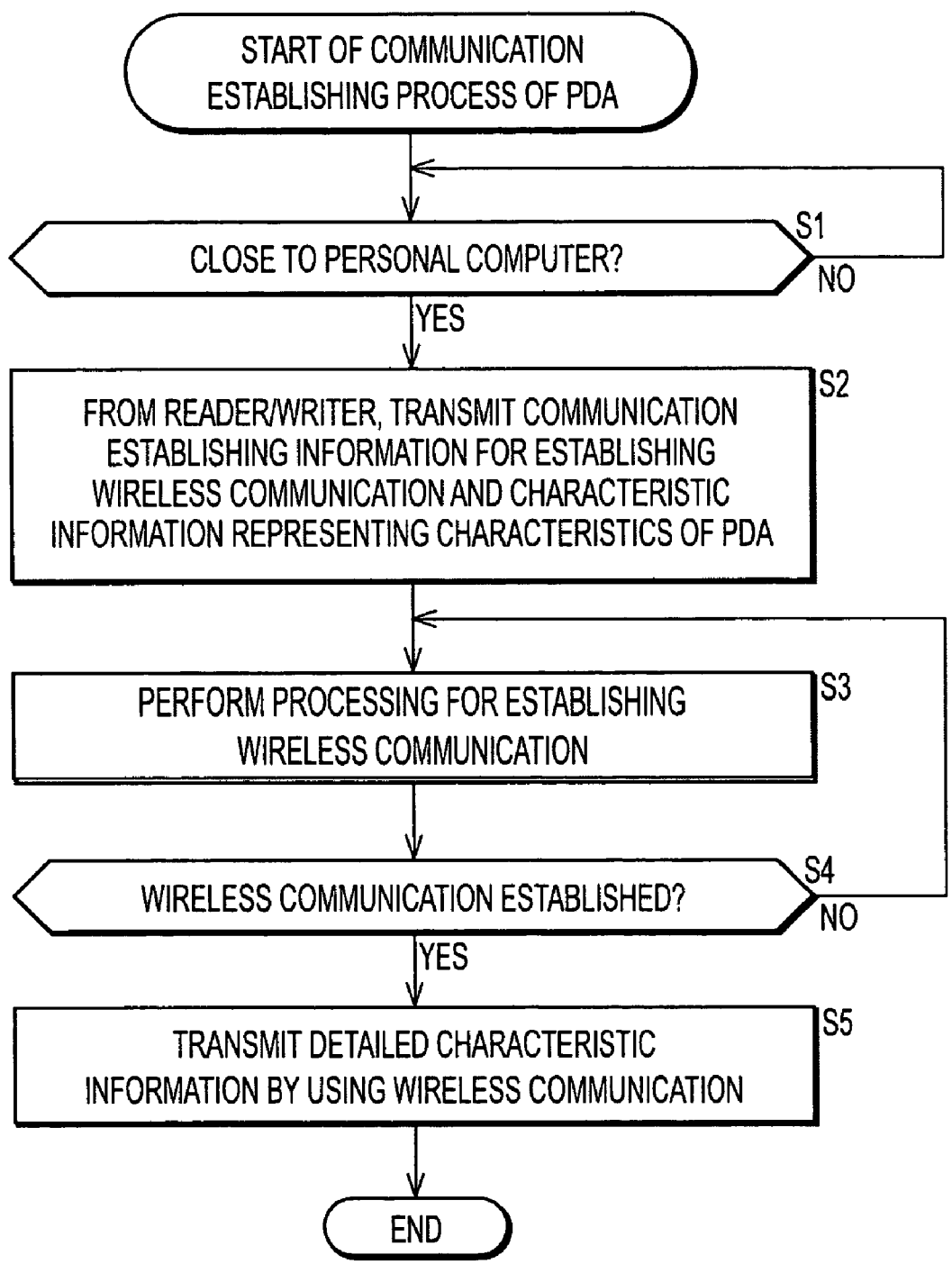

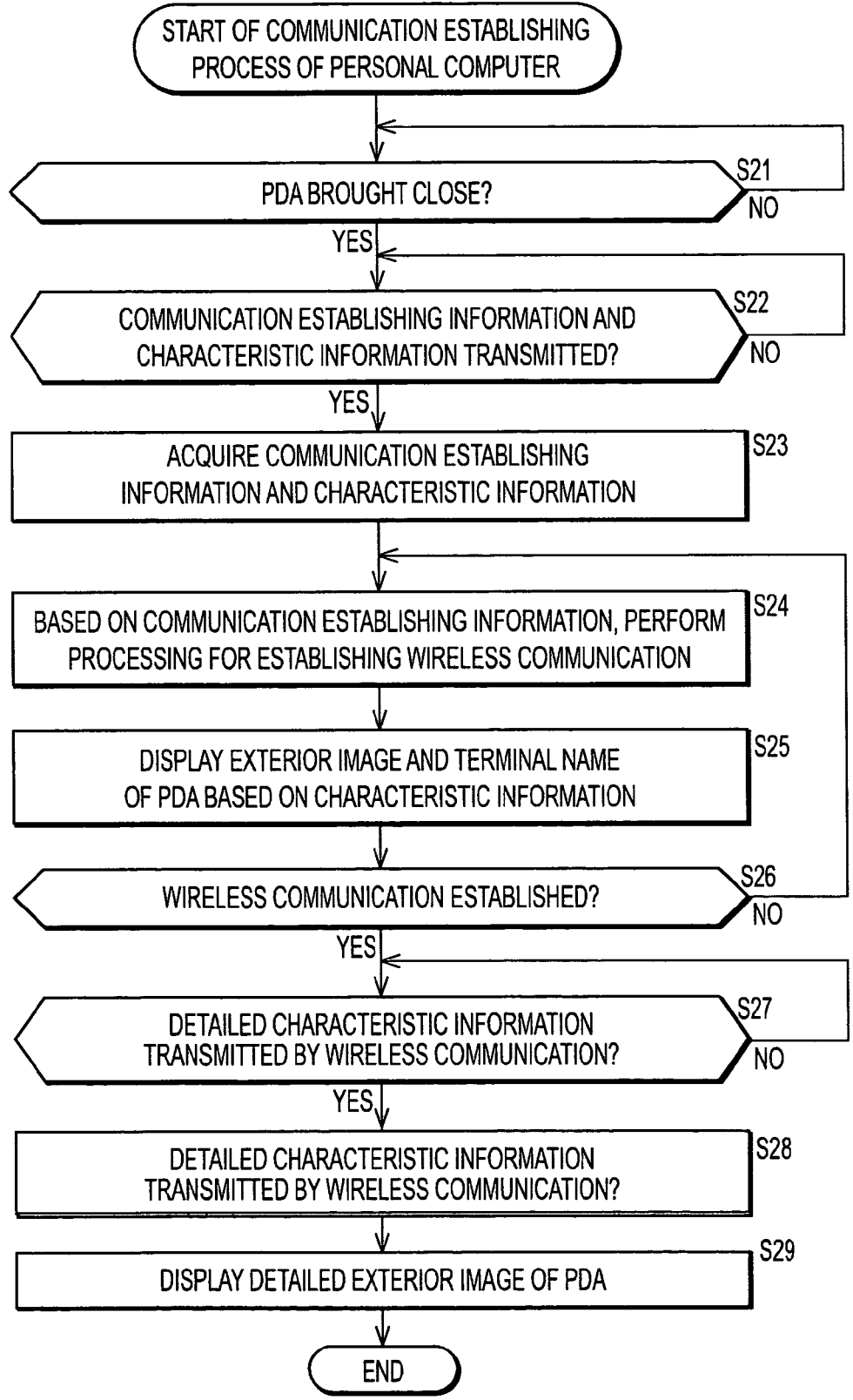

FIG. 12
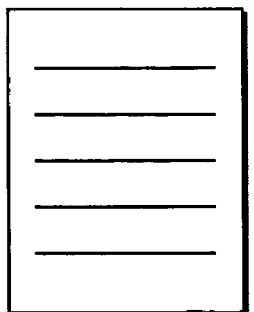
TEXT A
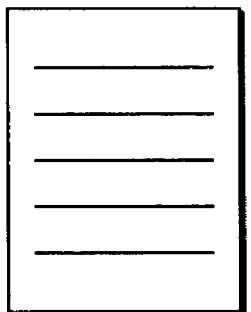
TEXT B
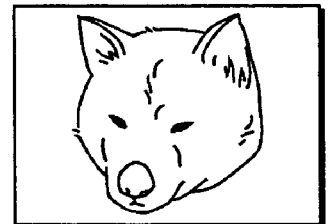
IMAGE A
all:3
text/plain:2
image/jpg:1
text:patent document of A system
text:reference document of the system
image:width=320,height=240
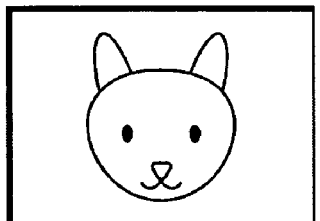
IMAGE A'
CHARACTERISTIC INFORMATION

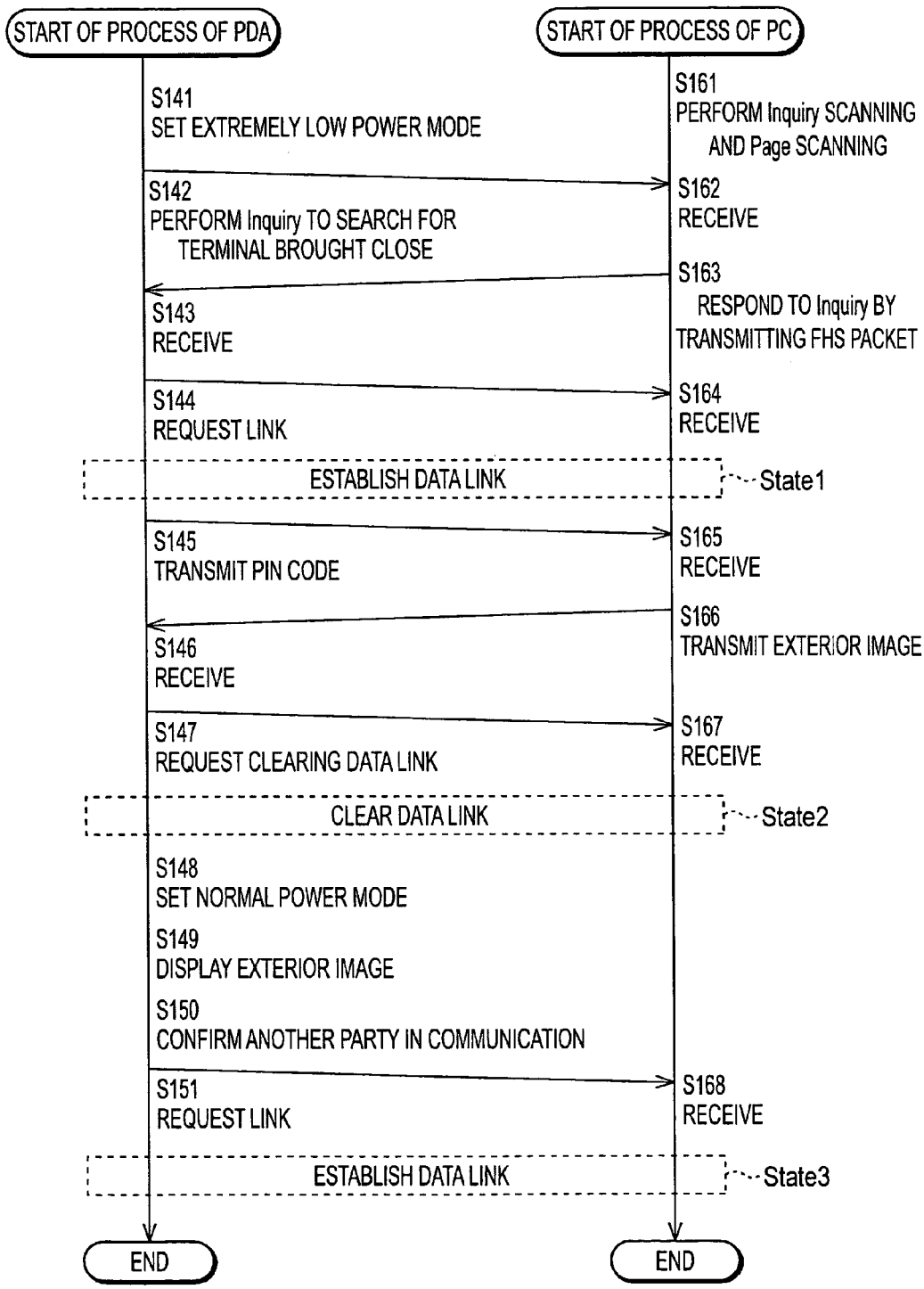

COMMUNICATION SYSTEM AND METHOD, INFORMATION PROCESSING TERMINAL AND METHOD, INFORMATION PROCESSING APPARATUS AND METHOD

TECHNICAL FIELD

The present invention relates to communication systems and methods, information processing terminals and methods, and information processing apparatuses and methods, and in particular, to a communication system and method, an information processing terminal and method, and an information processing apparatus and method each of which enables preferable confirmation of details of an operation.

BACKGROUND ART

Recently, wireless local area networks (wireless LANs), such as IEEE (Institute of Electrical and Electronics Engineers) 802.11b and 802.11a, and Bluetooth® have come to attention as wireless communication standards, and various pieces of equipment meeting these standards have been developed and sold.

However, wireless communication based on the above standards has a problem in that, after performing a predetermined operation for initiating communication in order to, for example, detect an apparatus, establish synchronization, and perform authentication, a lot of time is needed until actual communication starts.

The above wireless communication also has a problem in that, since the time required to prepare for starting communication is longer than expected, when a user does not receive any response (feedback) after the user performs some operation, the user may feel uneasy about the operation the user has performed. For example, even if the user mistakenly selects another party for communication, or the user mistakenly selects data to transmit, the user is unable to confirm the mistake until actual communication starts.

DISCLOSURE OF INVENTION

The present invention is made in view of the above circumstances and is intended to enable appropriate confirmation of operation details.

An information processing terminal included in a communication system of the present invention comprises: a first wireless communication means for performing first wireless communication with the information processing apparatus, which is brought close, through electromagnetic waves; and a second wireless communication means for performing second wireless communication with the information processing apparatus. The first wireless communication means transmits, to the information processing apparatus, at least one of terminal-characteristic information representing characteristics of the information processing terminal and data-characteristic information representing characteristics of predetermined data to be transmitted through the second wireless communication, and, in addition, communication establishing information for establishing the second wireless communication with the information processing apparatus, and the second wireless communication means establishes the second wireless communication with the information processing apparatus.

In addition, an information processing apparatus comprises: a third wireless communication means for performing the first wireless communication with the information processing terminal, which is brought close, through electromagnetic waves; a fourth wireless communication means for performing the second wireless communication with the information processing terminal; and an output means for outputting predetermined information acquired from the information processing terminal through the first wireless communication performed by the third wireless communication means. The third wireless communication means acquires at least one of the terminal-characteristic information and the data-characteristic information, and, in addition, the communication establishing information from the information processing terminal through the first wireless communication, the fourth wireless communication means establishes the second wireless communication with the information processing terminal based on the communication establishing information acquired by the third wireless communication means, and the output means outputs the terminal-characteristic information or data-characteristic information acquired by the third wireless communication means.

A communication method of the present invention for a communication system comprises the steps of: performing first wireless communication with an information processing apparatus, which is brought close, through electromagnetic waves; performing second wireless communication with the information processing apparatus; transmitting at least one of terminal-characteristic information representing characteristics of an information processing terminal and data-characteristic information representing predetermined data to be transmitted through the second wireless communication, and, in addition, communication establishing information for establishing the second wireless communication with the information processing apparatus; and establishing the second wireless communication with the second wireless communication. Also, the communication method comprises the steps of: performing the first wireless communication with the information processing terminal, which is brought close, through electromagnetic waves; performing the second wireless communication with the information processing terminal; outputting, through the first wireless communication, predetermined information acquired from the information processing terminal; acquiring one of the terminal-characteristic information and the data-characteristic information, and, in addition, the communication establishing information from the information processing terminal through the first wireless communication; establishing the second wireless communication with the information processing terminal based on the acquired communication establishing information; and outputting the acquired terminal-characteristic information or data-characteristic information.

An information processing terminal of the present invention comprises: a first wireless communication means for performing first wireless communication with an information processing apparatus, which is brought close, through electromagnetic waves; and a second wireless communication means for performing second wireless communication with the information processing apparatus. The first wireless communication means transmits, to the information processing apparatus, at least one of first terminal-characteristic information representing characteristics of the information processing terminal and data-characteristic information representing characteristics of predetermined data to be transmitted through the second wireless communication, and, in addition, communication establishing information for establishing the second wireless communication with the information processing apparatus, and the second wireless communication means establishes the second wireless communication with the information processing apparatus.

The information processing terminal may further comprise a generating means for generating the data-characteristic information when the predetermined data to be transmitted through the second wireless communication is selected.

In a case in which the second wireless communication means establishes the second wireless communication: when the first terminal-characteristic information is transmitted to the information processing apparatus, second terminal-characteristic information having an amount of data larger than that of the first terminal-characteristic information may be transmitted to the information processing apparatus through the second wireless communication; and when the data-characteristic information is transmitted to the information processing apparatus, the predetermined data may be transmitted to the information processing apparatus through the second wireless communication.

The first terminal-characteristic information may include at least an image showing the exterior of the information processing terminal, and the data-characteristic information may include at least information identifying the data format of the predetermined data.

An information processing method of the present invention for an information processing terminal comprising the steps of: performing first wireless communication with an information processing apparatus, which is brought close, through electromagnetic waves; performing second wireless communication with the information processing apparatus; transmitting, to the information processing apparatus, through the first wireless communication, at least one of terminal-characteristic information representing characteristics of an information processing terminal and data-characteristic information representing characteristics of predetermined data to be transmitted through the second wireless communication, and, in addition, communication establishing information for establishing the second wireless communication with the information processing apparatus; and establishing the second wireless communication with the information processing apparatus.

A first program of the present invention allows a computer to execute the steps of: controlling first wireless communication with an information processing apparatus, which is brought close, the first wireless communication being performed through electromagnetic waves; controlling second wireless communication performed with the information processing apparatus; controlling transmission through the first wireless communication of at least one of terminal-characteristic information representing an information processing terminal and data-characteristic information representing characteristics of predetermined data to be transmitted through the second wireless communication, and, in addition, communication establishing information for establishing the second wireless communication with the information processing apparatus; and controlling the establishment of the second wireless communication with the information processing apparatus.

An information processing apparatus of the present invention comprises: a first wireless communication means for performing first wireless communication with an information processing terminal, which is brought close, through electromagnetic waves; a second wireless communication means for performing second wireless communication with the information processing terminal; and an output means for outputting predetermined information acquired from the information processing terminal through the first wireless communication performed by the first wireless communication means. The first wireless communication means acquires, from the information processing terminal, through the first wireless communication, at least one of first terminal-characteristic information representing characteristics of the information processing terminal and data-characteristic information representing characteristics of predetermined data to be transmitted from the information processing terminal through the second wireless communication, and, in addition, communication establishing information for establishing the second wireless communication with the information processing terminal, the second wireless communication means establishes the second wireless communication with the information processing terminal based on the communication establishing information acquired by the first wireless communication means, and the output means outputs the first terminal-characteristic information or data-characteristic information acquired by the wireless communication means.

When second terminal-characteristic information having an amount of data larger than that of the first terminal-characteristic information is transmitted through the second wireless communication from the information processing terminal, the second wireless communication means may acquire the second terminal-characteristic information, and when the second terminal-characteristic information is acquired through the second wireless communication means, the output means may output the second terminal-characteristic information instead of the first terminal-characteristic information.

When the predetermined data is transmitted from the information processing terminal, the second wireless communication means may acquire the predetermined data, and when the predetermined data is acquired by the wireless communication means, the output means may output the predetermined data.

An information processing method of the present invention for an information processing apparatus comprises the steps of: performing first wireless communication with an information processing terminal, which is brought close, through electromagnetic waves; performing second wireless communication with the information processing terminal; outputting predetermined information acquired from the information processing terminal through the first wireless communication; acquiring, from the information processing terminal, by the first wireless communication, at least one of terminal-characteristic information representing characteristics of the information processing terminal and data-characteristic information representing characteristics of predetermined data to be transmitted from the information processing terminal, and, in addition, communication establishing information; establishing the second wireless communication with the information processing terminal based on the acquired communication establishing information; and outputting the acquired terminal-characteristic information or data-characteristic information.

A second program of the present invention allows a computer to execute the steps of: controlling first wireless communication with an information processing terminal, which is brought close, the first wireless communication being performed through electromagnetic waves; controlling second wireless communication performed with the information processing terminal; controlling output of predetermined information acquired from the information processing terminal through the first wireless communication; controlling, through the first wireless communication, acquisition, from the information processing terminal, of at least one of terminal-characteristic information representing characteristics of the information processing terminal and data-characteristic information representing characteristics of predetermined data to be transmitted from the information processing terminal, and, in addition, communication establishing information for establishing the second wireless communication with the information processing terminal; controlling the establishment of the second wireless communication with the information processing terminal based on the acquired communication establishing information; and controlling output of the acquired terminal-characteristic information or data-characteristic information.

According to a communication system and method of the present invention, first wireless communication through electromagnetic waves with an information processing apparatus, which is brought close, is performed by an information processing terminal, and second wireless communication with the information processing apparatus is performed. Also, at least one of terminal-characteristic information representing characteristics of the information processing terminal and data-characteristic information representing characteristics of predetermined data to be transmitted through the second wireless communication, and, in addition, communication establishing information for establishing the second wireless communication with the information processing apparatus are transmitted to the information processing apparatus through the first wireless communication, and the second wireless communication with the information processing apparatus is established. In addition, the first wireless communication with the information processing terminal, which is brought close, is performed by the information processing apparatus through electromagnetic waves, and predetermined information acquired from the information processing terminal is output through the first wireless communication. Moreover, at least one of the terminal-characteristic information and the data-characteristic information, and the communication establishing information are acquired from the information processing terminal through the first wireless communication, and based on the acquired communication establishing information, the second wireless communication with the information processing apparatus is established, and the acquired terminal-characteristic information or data-characteristic information is output.

According to an information processing terminal and method, and program of the present invention, first wireless communication with an information processing apparatus, which is brought close, is performed through electromagnetic waves, and second wireless communication with the information processing apparatus is performed. In addition, at least one of first terminal-characteristic information representing the information processing terminal and data-characteristic information representing characteristics of predetermined data to be transmitted through the second wireless communication, and, in addition, communication establishing information for establishing the second wireless communication with the information processing apparatus are transmitted to the information processing apparatus through the first wireless communication, and the second wireless communication with the information processing apparatus is established.

According to an information processing apparatus and method, and program of the present invention, first wireless communication with an information processing terminal, which is brought close, is performed through electromagnetic waves, second wireless communication with the information processing terminal is performed, and predetermined information acquired from the information processing terminal is output through the first wireless communication. In addition, at least one of first terminal-characteristic information representing characteristics of the information processing terminal and data-characteristic information representing characteristics of predetermined data to be transmitted through the second wireless communication, and, in addition, communication establishing information for establishing the second wireless communication with the information processing terminal are acquired from the information processing terminal through the first wireless communication. Based on the acquired communication establishing information, the second wireless communication with the information processing terminal is performed, and the acquired first terminal-characteristic information or data-characteristic information is output.

BRIEF DESCRIPTION OF THE DRAWINGS

FIG. 7 is a flowchart illustrating the PDA in FIG. 1.

FIG. 8 is a flowchart illustrating a process of the personal computer in FIG. 1.

FIG. 12 is an illustration of another example of characteristic information.

FIG. 19 is a flowchart illustrating another operation of the communication system in FIG. 16.

BEST MODE FOR CARRYING OUT THE INVENTION

Figure 1:
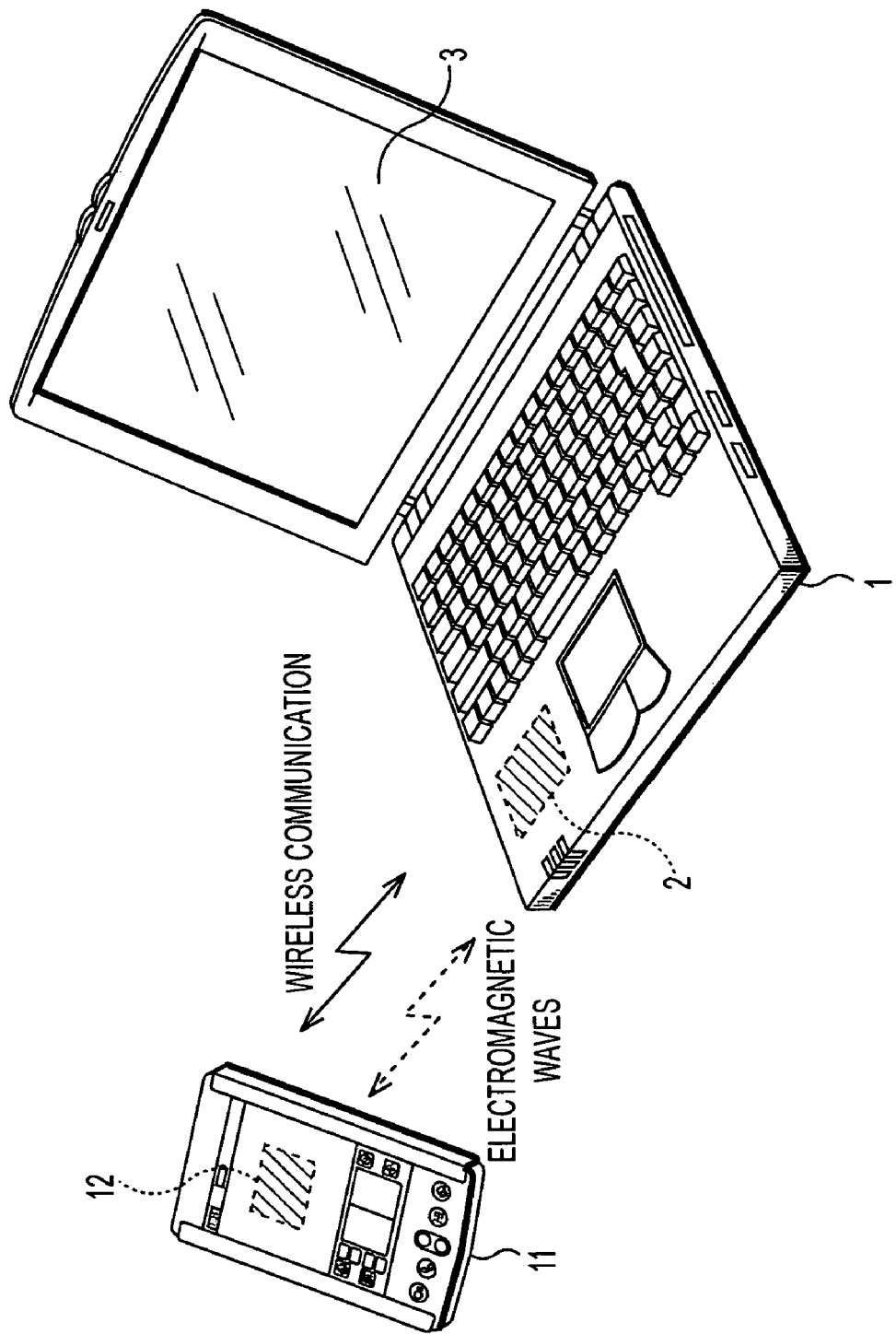
FIG. 1 is a block diagram showing an example of a communication system to which the present invention is applied.

FIG. 1 is an illustration of an example of a communication system to which the present invention is applied.

A personal computer 1 and a PDA (Personal Digital Assistants) 11 each have a built-in wireless communication unit that can perform communication based on IEEE (Institute of Electrical and Electronics Engineers) 802.11b, IEEE802.11a (wireless LAN (Local Area Network)), etc., and can mutually transmit and receive various types of data through wireless communication between both units, as indicated by the solid line arrow in the Figure.

The personal computer 1 and the PDA 11 respectively have a built-in reader/writer 2 and reader/writer 12 which can read or write various types of information when the personal computer 1 and the PDA 11 are brought close to each other.

Accordingly, each of the personal computer 1 and the personal computer 1 can perform, not only wireless communication based on Bluetooth or wireless LAN, but also communication through electromagnetic waves radiated from the reader/writer 2 or the reader/writer 12, as indicated by the dashed line in the Figure (When communication performed between the personal computer 1 and the PDA 11, other than reader/writer communication, that is, communication based on Bluetooth and wireless LAN does not need to be distinguished, it is simply referred to as wireless communication).

Detailed processing is described later with reference to flowcharts. In the communication system shown in FIG. 1, when a user brings the PDA 11 close to the personal computer 1 in order to start wireless communication (Bluetooth or wireless communication) between the personal computer 1 and the PDA 11, information (communication establishing information) for establishing wireless communication and characteristic information representing characteristics of the PDA 11 are transmitted from, for example, the reader/writer 12 of the PDA 11 to the reader/writer 2 of the personal computer 1.

The communication establishing information is, for example, the various types of information required for establishing wireless communication, such as a Bluetooth address defined in Bluetooth for identifying each apparatus, or an MAC (Media Access Control Address) address. For example, in Bluetooth, based on a Bluetooth address of an apparatus functioning as a master, a frequency hopping pattern and time slots are shared, whereby synchronization can be established.

In addition, the characteristic information representing the characteristics of the PDA 11 is, for example, information concerning an image showing the exterior of the PDA 11, the terminal name of the PDA 11, the terminal type of the PDA 11, etc.

When the reader/writer 2 receives the communication establishing information and characteristic information transmitted from the PDA 11, the personal computer 1 displays, based on the characteristic information, an exterior image of the PDA 11 and an apparatus name on the display unit 3, and performs various processes based on the communication establishing information between it and the PDA 11, such as a synchronization establishing process and an authentication process.

Normally, when wireless communication is established based information acquired by using electromagnetic waves, for various processes, such as a synchronization establishing process and an authentication process as described above, a certain amount of time is required. On the display unit 3 of the personal computer 1, the exterior image and terminal name of the PDA 11 are displayed. Accordingly, the user can confirm that processing for establishing wireless communication is being performed between the personal computer 1 and the PDA 11.

Also, by transmitting, as characteristic information, information representing characteristics such as the format of data to be transmitted through wireless communication, and controlling the personal computer 1 to display the characteristic information, the user can confirm the format of data, etc., before the data is transmitted through wireless communication from the PDA 11 after wireless communication is established.

For example, when predetermined image data is selected, as data to be transmitted to the personal computer 1 through wireless communication, by the user, the PDA 11 generates an image (image having a reduced amount of data) obtained by simplifying the image data, and transmits the image to the personal computer 1 through electromagnetic waves. The personal computer 1 displays the transmitted image on the display unit 3 for presentation to the user.

By confirming a displayed image (an image obtained by simplifying the image to be transmitted through wireless communication), the user can know beforehand what the image to be transmitted through wireless communication is. In addition, by displaying image size, the amount of data, a transfer time, etc., the user can confirm these pieces of information beforehand.

Definitely, it is possible that transmission and reception of the characteristic information between both display the exterior image of the personal computer 1, etc., on the display unit of the PDA 11.

Next, the components of the communication system in FIG. 1 are described.

Figure 2:
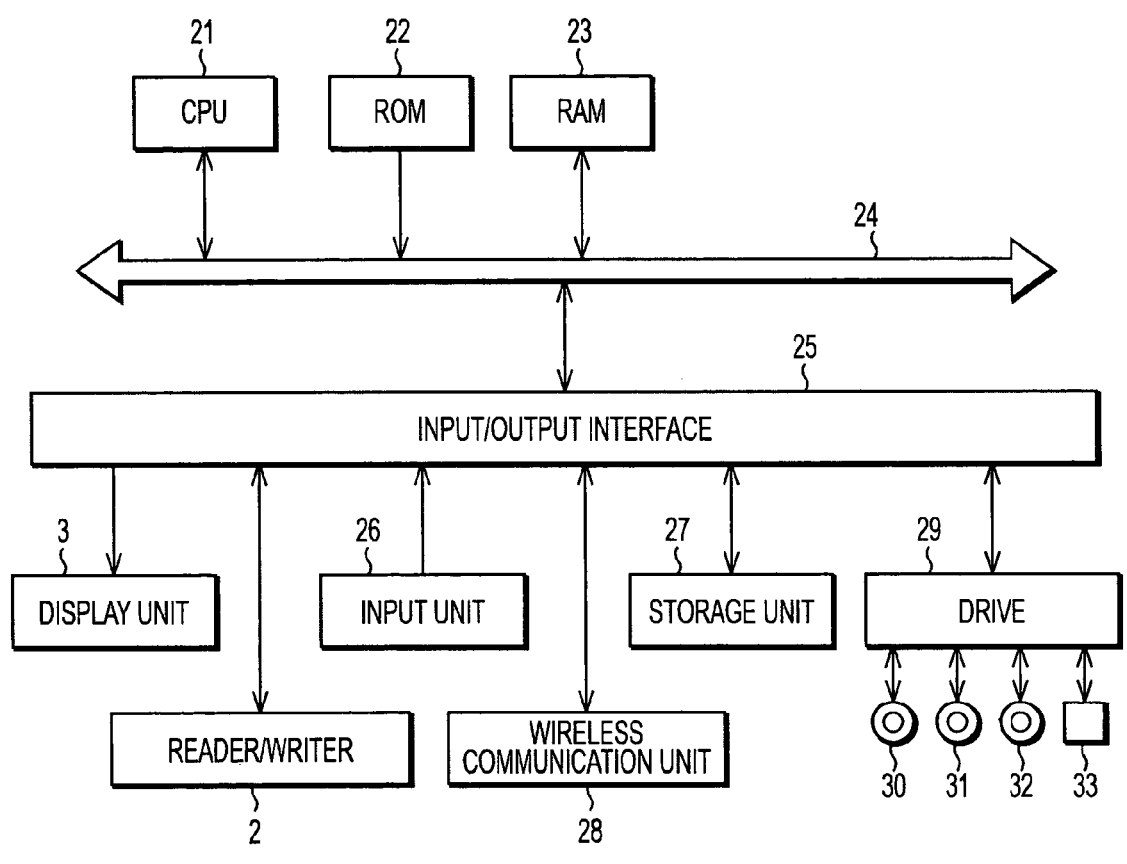
FIG. 2 is a block diagram showing an example of the personal computer in FIG. 1.

FIG. 2 is a block diagram showing an example of the configuration of the personal computer 1 in FIG. 1.

A CPU (Central Processing Unit) 21 executes various processes in accordance with a program stored in a ROM (Read Only Memory) 22 or a storage unit 27. The ROM 23 stores the program executed by the CPU 21 and data, if required. The CPU 21, the ROM 22, and the RAM 23 are connected to one another by a bus 24.

The bus 24 connects to an input/output interface 25, and the interface 25 connects to, for example, the display unit 3, which includes an LCD (Liquid Crystal Display), an input unit 26 which includes a keyboard and mouse operated by the user, and the storage unit 27, which includes a hard disk.

Also, the reader/writer 2, which uses electromagnetic waves to communicate with the reader/writer 12, which is built into the PDA 11, or the like, and a wireless communication unit 28 which communicates with the PDA 11 or the like by Bluetooth or a wireless LAN are connected to the input/output interface 25.

A drive 29 is connected to the input/output interface 25. In the drive 29, a magnetic disk 30, an optical disk 31, a magneto-optical disk 32, a semiconductor memory 33, or the like, can be loaded. A program read from one of the magnetic disk 30 to the semiconductor memory 33 is supplied and stored in, for example, the storage unit 27, from the drive 29 through the input/output interface 25.

Figure 3:
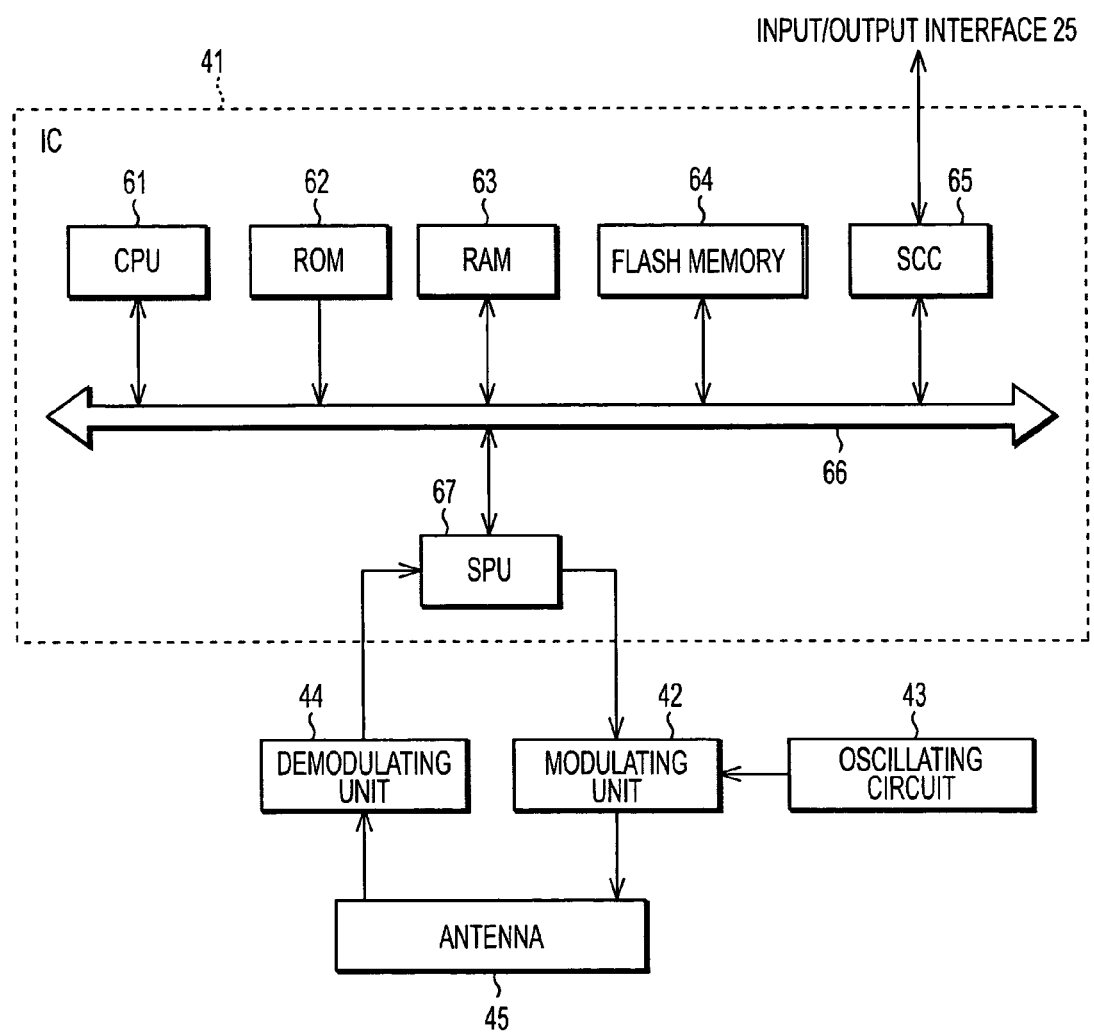
FIG. 3 is a block diagram showing an example of the reader/writer in FIG. 2.

FIG. 3 is a block diagram showing an example of the detailed configuration of the reader/writer 2 in FIG. 2.

An IC 41 includes a CPU 61, a ROM 62, a flash memory 64, an SCC (Serial Communication Controller) 65, an SPU (Signal Processing Unit) 67, and a bus 66 for connecting the CPU 61 to the SPU 67 to one another.

The CPU 61 loads a control program stored in the ROM 62 into the RAM 63, and executes various processes based on data transmitted from the reader/writer 12 of the PDA 11 or a control signal supplied from the CPU 21. For example, the CPU 61 generates a command which is transmitted to the reader/writer 12, outputs the command to the SPU 67 through the bus 66, and performs authenticating data transmitted from the reader/writer 12.

The flash memory 64 stores the communication establishing information and characteristic information concerning the personal computer 1, and outputs the stored information to the SPU 67 when being instructed by the CPU 61. When the wireless communication unit 28 is, for example, a module for Bluetooth, the flash memory 64 stores a Bluetooth address set for the wireless communication unit 28, or information concerning providable services, while, when the wireless communication unit 28 is a module for a wireless LAN, the wireless communication unit 28 stores an MAC address, the number of channels, an ESS-ID (Extended Service Set-Identification), etc.

In addition, the flash memory 64 stores, as the characteristic information of the personal computer 1, the exterior image and terminal name of the personal computer 1, etc.

Moreover, when predetermined data is selected as data to be transmitted from the wireless communication unit 28, characteristic information representing characteristics of the selected data is generated by the CPU 21 and is transmitted through the SCC 65. Accordingly, the flash memory 64 also stores the thus generated characteristic information, if required.

The SCC 65 supplies the CPU 61 with the data supplied from the CPU 21 in FIG. 2 through the bus 66, and outputs, to the CPU 21, the data supplied through the bus 66.

When being supplied with predetermined data from a demodulating unit 44, the SPU 67 performs, for example, BPSK (Binary Phase Shift Keying) demodulation (Manchester code decoding) on the supplied data, and supplies the obtained data to the CPU 61. Also, when a command to be transmitted to the PDA 11 is supplied through the bus 66, the SPU 67 performs BPSK modulation (coding to Manchester code) on the command, and outputs the obtained data to a modulating unit 42.

The modulating unit 42 performs ASK (Amplitude Shift Keying) modulation based on data supplied from the SPU 67, on a carrier having a predetermined frequency (e.g., 13.6 MHz) supplied from an oscillating circuit 43, and outputs the generated modulated waves as electromagnetic waves from an antenna 45. The demodulating unit 44 demodulates the modulated waves acquired through the antenna 45 and outputs the demodulated data to the SPU 67.

The antenna 45 radiates predetermined electromagnetic waves, detects, for example, the PDA 11 (the reader/writer 12), based on a change in a load on the electromagnetic waves, and transmits and receives various types of data.

Figure 4:
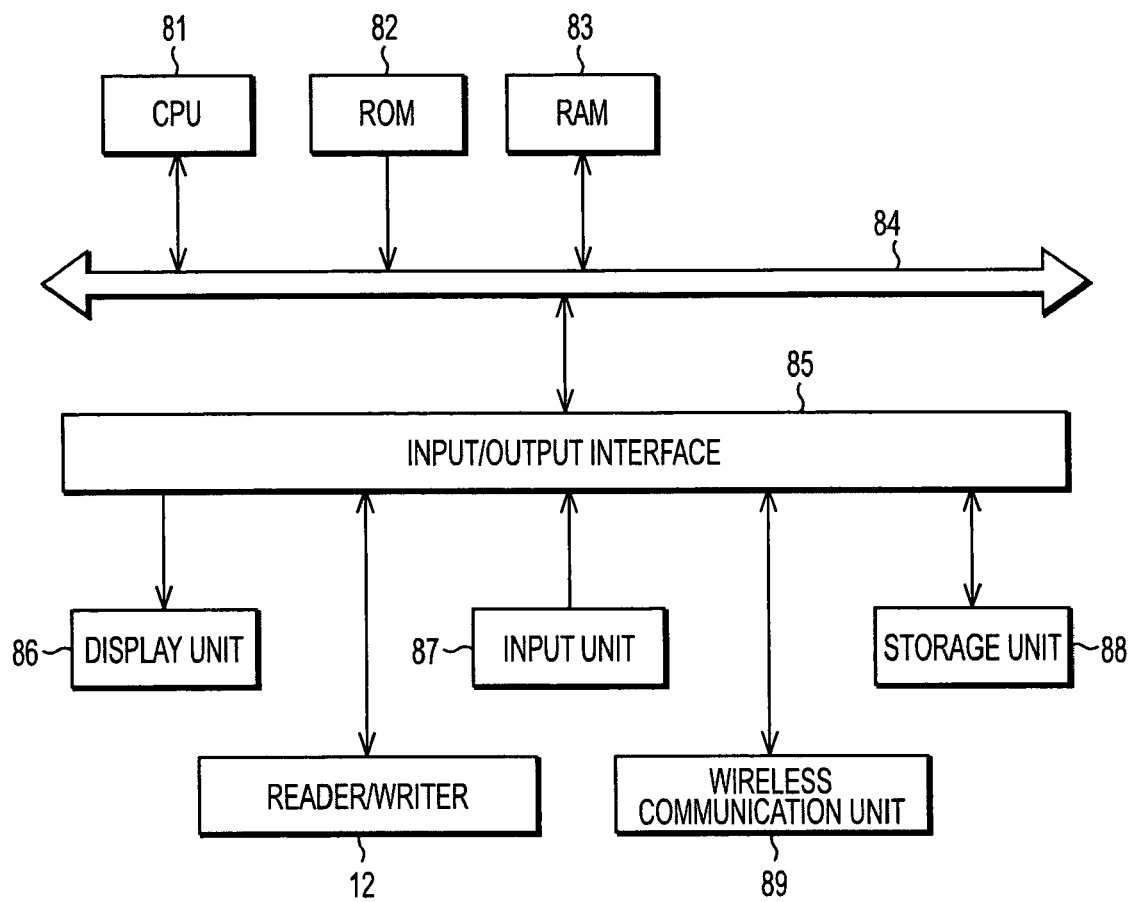
FIG. 4 is a block diagram showing an example of the PDA in FIG. 1.

FIG. 4 is a block diagram showing an example of the configuration of the PDA 11 in FIG. 1.

A detailed description of a CPU 81 to a wireless communication unit 89 is omitted since they are basically similar in configuration to the CPU 21 to the wireless communication unit 28 in FIG. 2.

When the PDA 11 is brought close to the personal computer 1, and the reader/writer 12 receives, for example, electromagnetic waves radiated from the reader/writer 2, the reader/writer 12 provides the stored communication establishing information and characteristic information to the reader/writer 2.

A wireless communication unit 89 is a module that performs wireless communication through Bluetooth and a wireless LAN similarly to the wireless communication unit 28 of the personal computer 1. In response to a call from the wireless communication unit 28, or based on the communication establishing information of the personal computer 1 which is supplied after being received by the reader/writer 12, the wireless communication unit 89 establishes wireless communication with the wireless communication unit 28, and subsequently transmits and receives various types of information.

Figure 5:
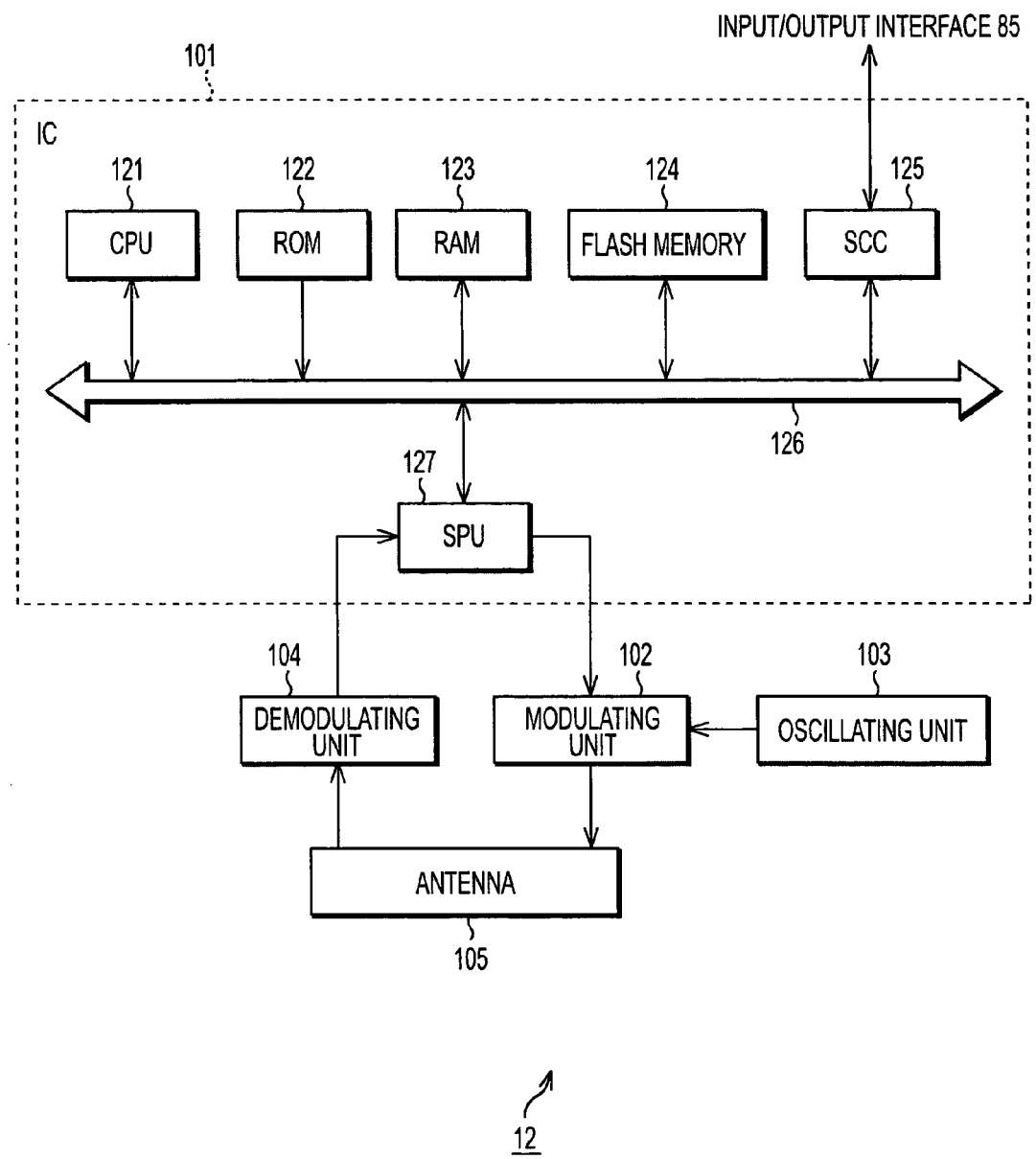
FIG. 5 is a block diagram showing an example of the reader/writer in FIG. 4.

FIG. 5 is a block diagram showing an example of the detailed configuration of the reader/writer 12 in FIG. 4.

A detailed description of the reader/writer 12 is omitted if necessary since it is basically similar in configuration to the reader/writer 2 shown in FIG. 3.

When the wireless communication unit 89 is a module for Bluetooth, the flash memory 124 stores, as the communication establishing information, a Bluetooth address set in the wireless communication unit 89, or information concerning providable services, or the like, while, when the wireless communication unit 89 is a module for a wireless LAN, the flash memory 124 stores an MAC address or the like.

Also, the flash memory 124 stores, as the characteristic information of the PDA 11, an exterior image and terminal name, etc., of the PDA 11.

Figure 6A:
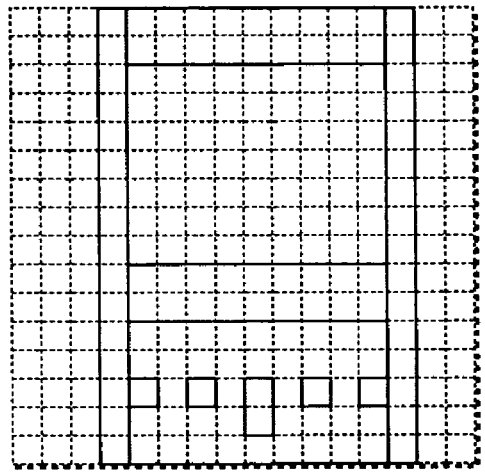
FIG. 6A is a block diagram showing an example of characteristic information.
Figure 6B:
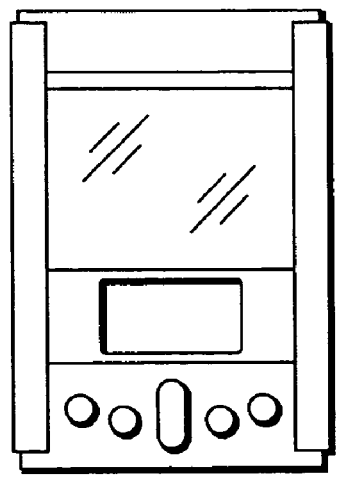
FIG. 6B is an illustration of characteristic information.

FIG. 6A and FIG. 6B are illustrations of examples of image data (exterior image) stored in the flash memory 124.

In the flash memory 124, data that allows the display unit 3 to display the images shown in FIG. 6A and FIG. 6B is stored as image data of the PDA 11.

When, for example, the characteristic information stored in the flash memory 124 is transmitted, the display unit 3 of the personal computer 1 displays an exterior image Next, processing of the communication system in FIG. 1 is described.

At first, a process of the PDA 11 which establishes wireless communication with the personal computer 1 is described with reference to the flowchart in FIG. 7.

In step S1, based on an output from the reader/writer 12, the CPU 81 determines whether the PDA 11 is brought close to the personal computer 1, and is on standby until it determines that the PDA 11 is brought close to the personal computer 1.

For example, when the user brings the PDA 11 close to the personal computer 1 in order to start wireless communication, in response to electromagnetic waves (electromagnetic waves for detection) radiated from the reader/writer 2 of the personal computer 1, or in accordance with reception of a response of the reader/writer 2 to electromagnetic waves radiated by the PDA 11, the reader/writer 12 notifies the CPU 81 that the PDA 11 is close to the personal computer 1.

If the CPU 81 has determined in step S1 that the PDA 11 is brought close to the personal computer 1, it proceeds to step S2, and transmits communication establishing information for establishing wireless communication and characteristic information of the PDA 11 from the reader/writer 12.

When the wireless communication unit 89 is, for example, a module for Bluetooth, as described above, a Bluetooth address and information concerning service which are prepared in the flash memory 124 are transmitted as the communication establishing information to the personal computer 1 (the reader/writer 2).

Also, for example, information of the terminal name of the PDA 11, and image information for displaying images as shown in FIG. 6A and FIG. 6B, which are prepared in the flash memory 124, are transmitted as the characteristic information to the personal computer 1.

In step S3, the CPU 81 controls the wireless communication unit 89 to perform a process for establishing wireless communication with the personal computer 1 (the wireless communication unit 28).

For example, when the Bluetooth address of the wireless communication unit 89 is provided as the characteristic information to the personal computer 1, the wireless communication unit 28 in the personal computer 1 identifies the PDA 11 as another party in communication, and various processes are performed between the wireless communication unit 28 and the wireless communication unit 89. Details of the processes performed between the wireless communication unit 28 in the personal computer 1 and the wireless communication unit 89 in the PDA 11 are described later.

In step S4, based on the notification from the wireless communication unit 89, the CPU 81 determines whether or not the wireless communication with the personal computer 1 has been established. The CPU 81 returns to step S3 and repeatedly executes the subsequent steps until it determines that the wireless communication has been established.

Alternately, when determining in step S4 that the wireless communication with the personal computer 1, such as Bluetooth, has been established, the CPU 81 proceeds to step S5. In a period after the characteristic information, or the like, of the PDA 11 is transmitted, until the wireless communication is established, exterior images of the PDA 11, as shown in FIG. 6A and FIG. 6B, are displayed on the display unit 3.

In step S5, the CPU 81 controls the wireless communication unit 89 to use the established wireless communication to transmit, to the personal computer 1, more detailed characteristic information (characteristic information whose data amount is large) than the already transmitted characteristic information. The characteristic information transmitted through wireless communication is more detailed (close to the real) exterior images than the exterior images of the PDA 11 as shown in FIG. 6A and FIG. 6B, and are stored in a storage unit 88.

The personal computer 1 displays a more detailed exterior image of the PDA 11 than the already displayed image of the PDA 11.

The detailed image information having such a large amount of data can be transmitted because the transmission speed of wireless communication, such as Bluetooth, is normally higher than that of communication in the reader/writer 12.

After that, the process ends, and various types of data are transmitted and received through Bluetooth or a wireless LAN between the wireless communication unit 89 of the PDA 11 and the wireless communication unit 28 of the personal computer 1.

Next, a communication establishing process of the personal computer 1, performed correspondingly to the process in FIG. 7, is described with reference to the flowchart in FIG. 7.

In step S21, the CPU 21 determines whether or not the PDA 11 is brought close, and is on standby until it determines that the PDA 11 is brought close. For example, electromagnetic waves for detecting a close device are radiated from the reader/writer 2. When a response to reception of the waves is transmitted from the PDA 11, the CPU 21 determines in step S21 that the PDA 11 is brought close, and proceeds to step S22.

In step S22, based on an output from the reader/writer 12, the CPU 21 determines whether or not the communication establishing information for establishing wireless communication and the characteristic information representing characteristics of the PDA 11 have been transmitted.

As described above, in step S2 in FIG. 7, the above types of information are transmitted from the reader/writer 12 of the PDA 11. Accordingly, the CPU 21 is on standby until the transmitted communication establishing information and characteristic information arrive.

If the CPU 21 has determined in step S22 that the transmitted communication establishing information and characteristic information have been transmitted, it proceeds to step S23, and acquires the characteristic information received by the reader/writer 2.

In step S24, the CPU 21 controls the wireless communication unit 28 to establish a wireless communication establishing process based on the communication establishing information.

For example, when the wireless communication unit 28 and the PDA 11 are modules for Bluetooth, the wireless communication unit 28 uses Inquiry as set forth in Bluetooth to detect close terminals, and acquires the Bluetooth address of each terminal.

Among the terminals detected by using the Inquiry, a terminal in which a Bluetooth address already posted in communication by the reader/writer 2 is set, that is, the PDA 11, is set as a terminal with which communication is performed, and "calling (Page)" as set forth in Bluetooth is performed only for the PDA 11.

The wireless communication unit 28 establishes time slot synchronization (time-base synchronization) with the wireless communication unit 89 of the PDA 11 by performing the "Inquiry" and the "Page", and allows a frequency hopping pattern to tune (establishes frequency-base synchronization) based on the Bluetooth address set in the personal computer 1.

The "Inquiry" posts the Bluetooth of the personal computer 1 to the wireless communication unit 89.

In step S25, based on the acquired characteristic information, the CPU 21 controls the display unit 3 to display the exterior image and terminal name of the PDA 11.

Figure 9:
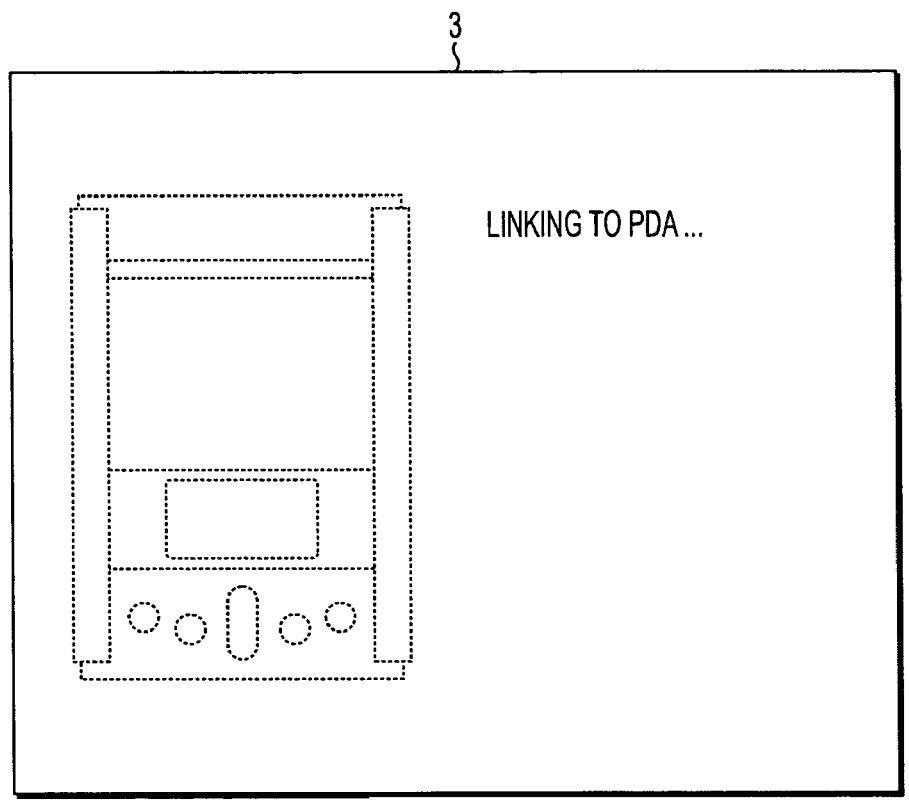
FIG. 9 is an illustration of an example of display by the personal computer.

FIG. 9 is an illustration of an example of a displayed image on the display unit 3.

When, for example, an image showing an outline as shown in FIG. 6B and information representing the terminal name "PDA" are prepared as the characteristic information in the reader/writer 12 (the flash memory 124) of the PDA 11, the CPU 21 displays the screen shown in FIG. 9 for the user when acquiring the above types of information.

In this case, the image showing the outline of the PDA 11 is displayed, and the message "LINKING TO PDA" including the terminal name "PDA" is adjacently displayed.

By confirming the displayed image, the user can confirm that the wireless communication establishing process between the personal computer 1 and the PDA 11 is being performed, that is, that a wireless communication establishing process is being performed between the personal computer 1 and a desired terminal.

If the image and terminal name of the PDA 11 is not displayed, the user can confirm that the wireless communication establishing process is being performed, but may be worried about a possibility that the process is being performed between the personal computer 1 and another terminal close thereto.

Referring back to FIG. 8, in step S26, the CPU 21 determines whether or not wireless communication with the PDA 11 has been established. The CPU 21 returns to step S24 and repeatedly executes the subsequent steps until it determines that the wireless communication has been established.

Alternately, if the CPU 21 has determined in step S26 that the wireless communication has been established, the CPU 21 proceeds to step S27, and determines whether or not the detailed characteristic information has been transmitted from the PDA 11 through the established wireless communication.

The CPU 21 is on standby until it determines in step S27 that the detailed characteristic information has been transmitted from the PDA 11. If it is determined that the detailed characteristic information has been transmitted, the CPU 21 proceeds to step S28 and acquires the detailed characteristic information.

In step S29, the CPU 21 uses the acquired detailed characteristic information to display the detail image of the PDA 11 on the display unit 3.

Figure 10:
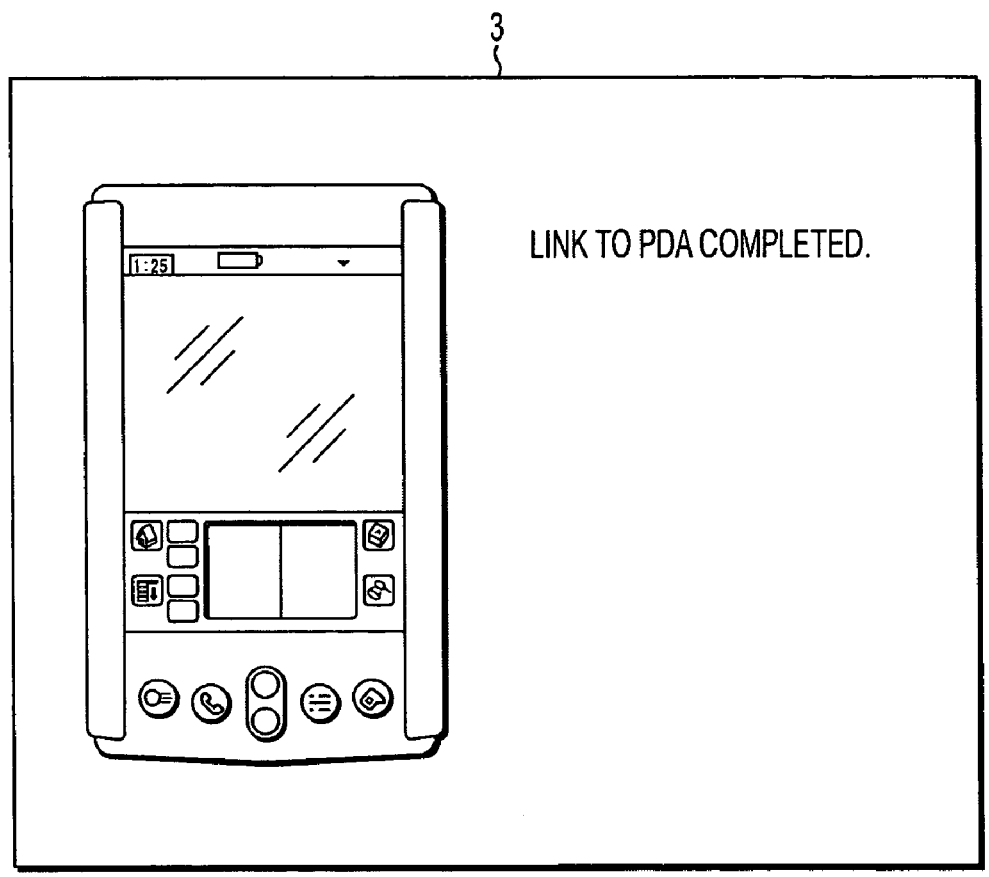
FIG. 10 is an illustration of an example of display by the personal computer.

FIG. 10 is an illustration of an example of an image displayed on the display unit 3 in step S29.

For example, when the storage unit 88 of the PDA 11 stores information (image information having a large amount of data) of an image of the PDA 11 which is substantially close to the real image, the information is received as detailed information by the wireless communication unit 28. Accordingly, the CPU 21 displays the screen shown in FIG. 10 for presentation to the user.

In this example, a more detailed image of the PDA 11 compared with that shown in FIG. 9 is displayed on the display unit 3, and the message "LINK TO PDA COMPLETED" including the terminal name "PDA" is adjacently displayed.

This enables the user to confirm establishment of the wireless communication such as Bluetooth or wireless LAN. After that, the established wireless communication transmits and receives various types of data between the personal computer 1 and the PDA 11.

Next, another process of the communication system shown in FIG. 1 is described.

As described above, after characteristic information in predetermined data which is transmitted through wireless communication is provided by using electromagnetic waves, wireless communication is established, and characteristic information can be displayed in the other device in a period in which the data is actually transmitted.

At first, a process of the PDA 11 which establishes wireless communication with the personal computer 1 is described with reference to the flowchart in FIG. 11. In this case, predetermined data selected by the user is transmitted from the PDA 11 to the personal computer 1 through wireless communication.

In step S41, based on an output from an input unit 87, the CPU 81 determines whether or not data to be transmitted has been selected by the user, and is on standby until it determines that the data has been selected. Data (selected data) that is transmitted through wireless communication is hereinafter referred to as transmitting data, if required.

In step S41, if the CPU 81 has determined that the transmitting data has been selected, it proceeds to step S42, and generates characteristic information representing the transmitting data and transfers the characteristic information to the reader/writer 12.

FIG. 12 is an illustration of an example of the characteristic information generated in step S42.

For example, when three data items (files), "TEXT A", "TEXT B", and "IMAGE A", are selected, characteristic information representing the format and title of data, or its size, etc., as the tip of the empty arrow indicates, is generated. Also, regarding "IMAGE A", its data amount is reduced by binarizing the source data, or reducing the data size, whereby characteristic information having an amount of data which can be transmitted from the reader/writer 12 is generated.

In this example, the number of transmitting data items is represented by "all:3" in the characteristic information, and the formats (text or image) of number of data items are represented by "text/plain:2" and "image/jpg:1". Also, the title of Text A is indicated by "patent document of A system", the title of Text B is indicated by "reference document of the system", and the size of Image A is indicated by "width=320, height=240".

Moreover, Image A is transformed into Image A' (the amount of data is reduced), whereby Image A' is formed as characteristic information representing characteristics of Image A.

The thus formed characteristic information is transmitted to the personal computer 1, with the above-described communication establishing information.

Referring back to FIG. 11, the subsequent processing in step S43 to step S46 is basically similar to that in step S1 to step S4 in FIG. 7. In other words, in step S43, based on the output from the reader/writer 12, the CPU 81 determines whether or not the PDA 11 is brought close to the personal computer 1. If the CPU 81 has determined that the PDA 11 is brought close, it proceeds to step S44.

In step S44, the CPU 81 controls the reader/writer 12 to transmit communication establishing information prepared beforehand and the characteristic information generated in step S42 from the reader/writer 12 to the personal computer 1. An image corresponding to the characteristic information is displayed on the display unit 3 of the personal computer 1, as later described with reference to the flowchart in FIG. 13.

In step S45, the CPU 81 controls the wireless communication unit 89 to perform the wireless communication establishing process, and proceeds to step S46 and determines whether or not the wireless communication has been established.

When determining in step S46 that the wireless communication has been established, the CPU 81 proceeds to step S47. It reads the transmitting data (in the above example, "TEXT A", "TEXT B", and "IMAGE A") selected by the user from the storage unit 88, and transmits the read data from the wireless communication unit 89 to the personal computer 1.

After that, the communication establishing process ends, and the established wireless communication transmits and receives various data items.

Figure 11:
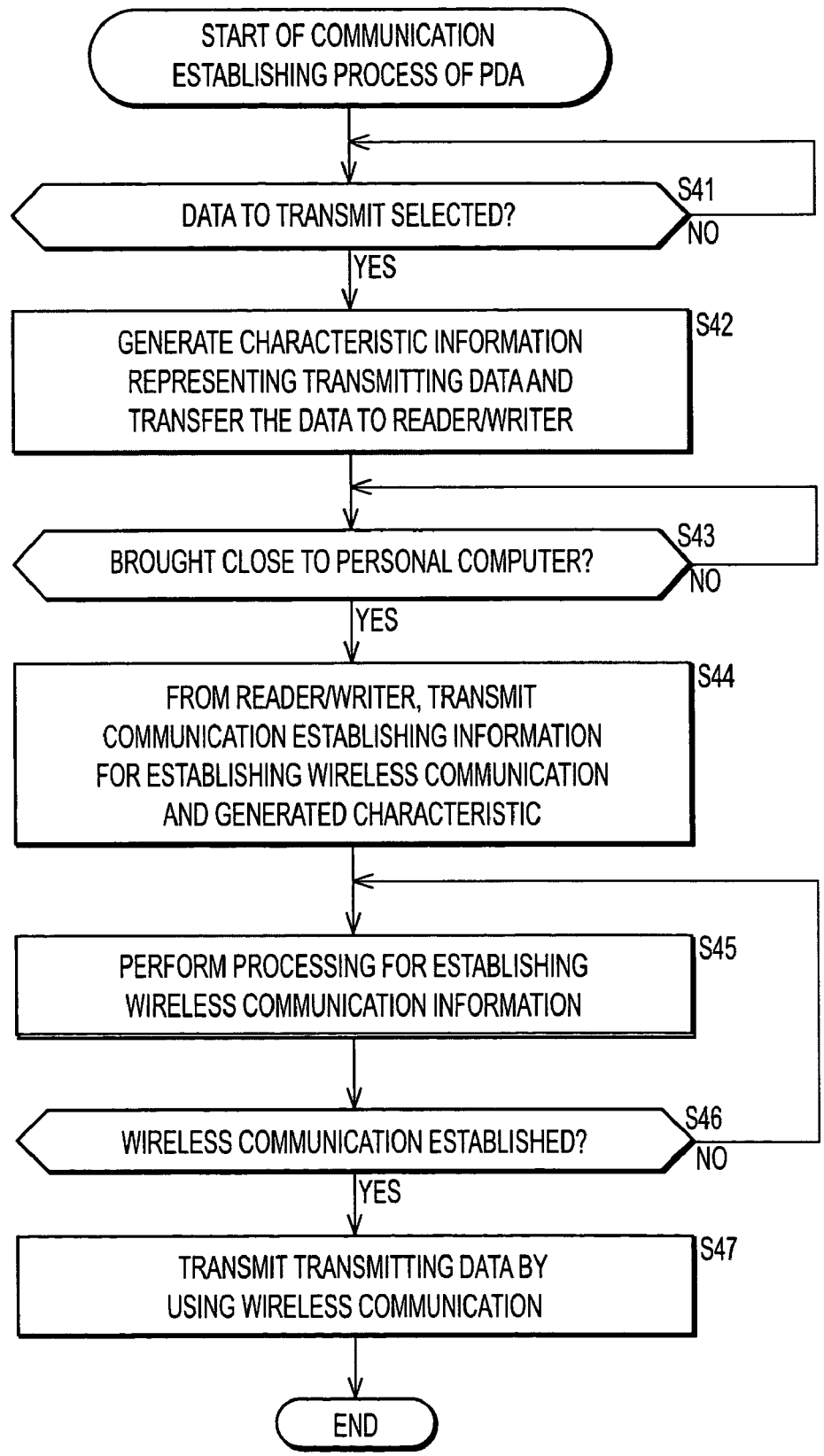
FIG. 11 is a flowchart illustrating another process of the PDA in FIG. 1.

Next, a process of the personal computer 1 which is executed correspondingly to the process in FIG. 11 is described with reference to the flowchart in FIG. 13.

Figure 13:
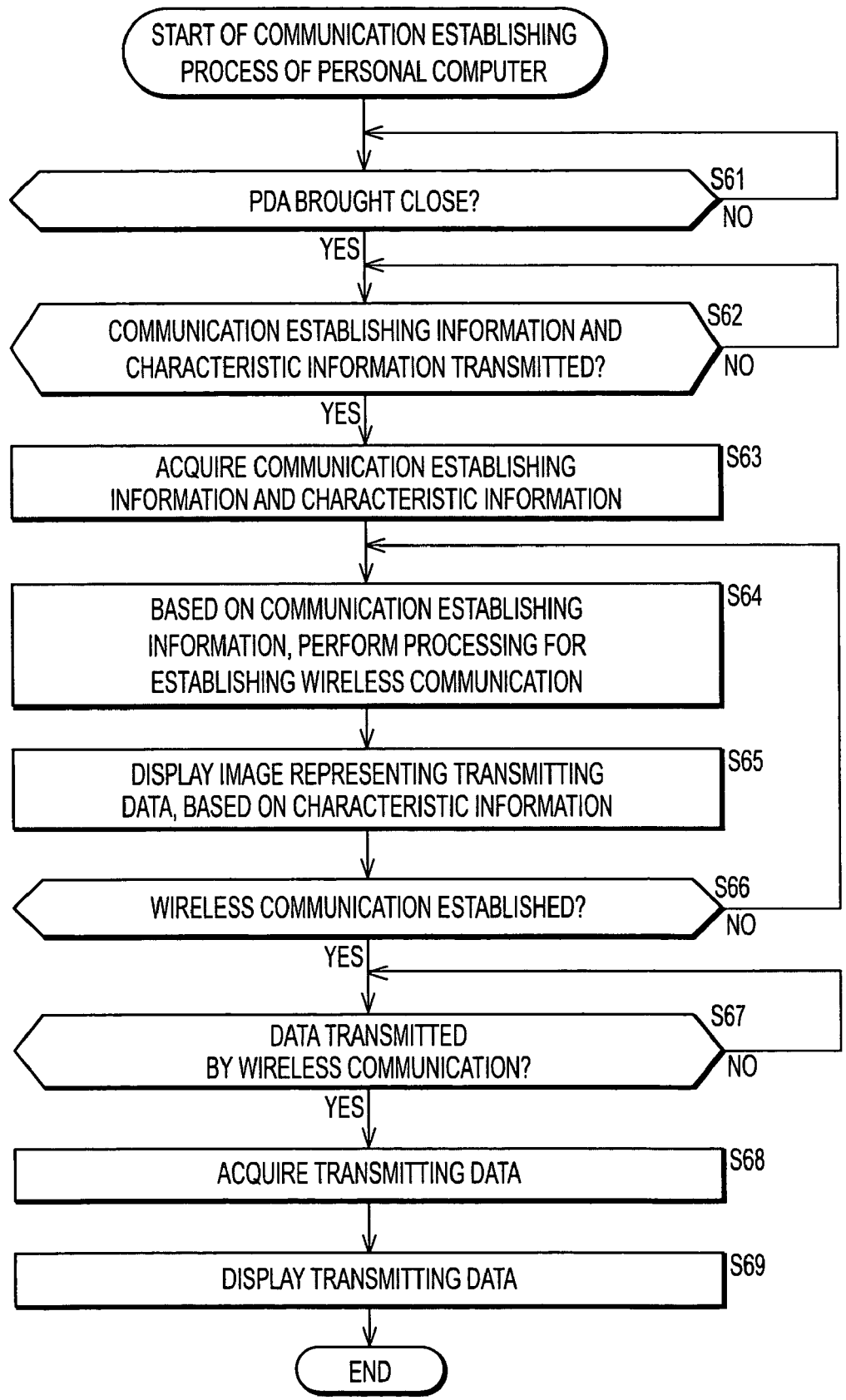
FIG. 13 is a flowchart illustrating another example of the personal computer in FIG. 1.

The process shown in FIG. 13 is basically similar to that described with reference to FIG. 8 excluding a difference in characteristic information transmitted from the PDA 11 through electromagnetic waves and a difference in image accordingly displayed.

In other words, in step S61, based on an output from the reader/writer 2, the CPU 21 determines whether or not the PDA 11 is brought close. If the CPU 21 has determined that the PDA 11 is brought close, it proceeds to step S62. In step S62, based on an output from the reader/writer 2, the CPU 21 determines whether or not the communication establishing information and the characteristic information (the generated characteristic information) have been transmitted. If the CPU 21 has determined that both have been transmitted, it proceeds to step S63 and acquires both.

When the wireless communication unit 28 is, for example, a module for Bluetooth, in step S64, the CPU 21 performs a wireless communication establishing process by executing "Inquiry", "Page", etc., as described above, and displays the acquired characteristic information on the display unit 3 in step S65.

Figure 14:
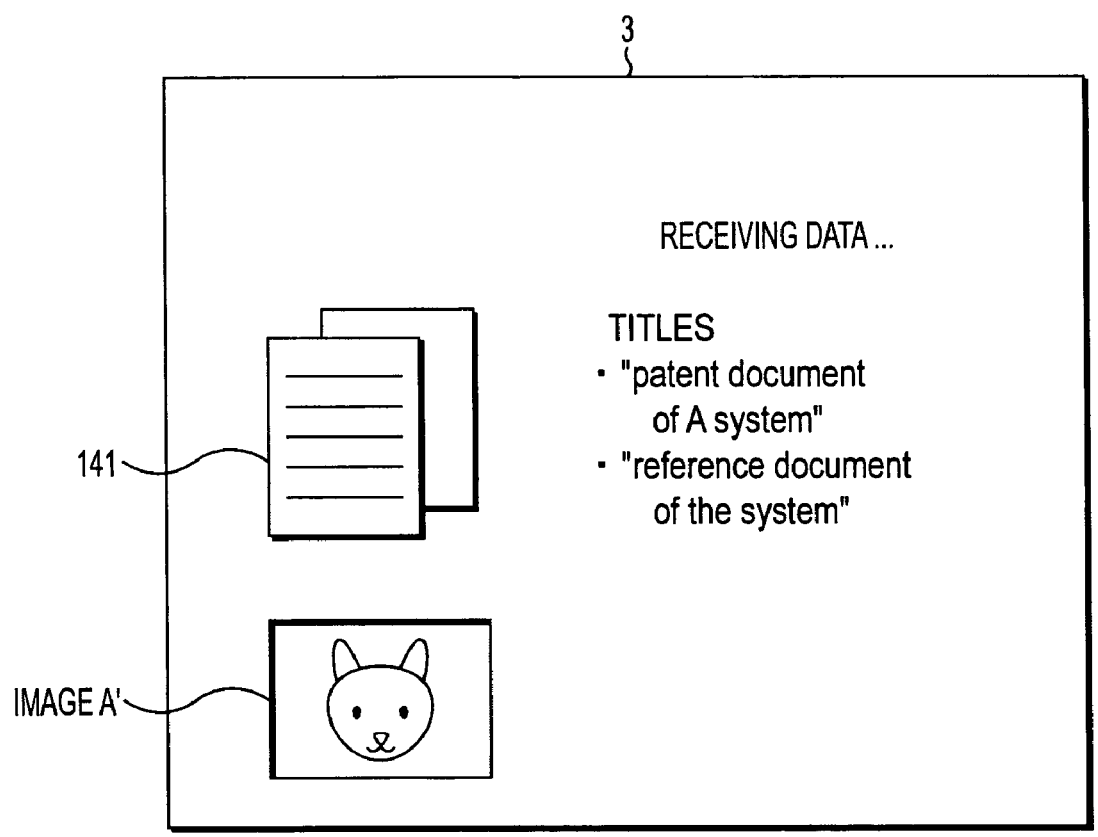
FIG. 14 is an illustration of a further example of display by the personal computer.

FIG. 14 is an illustration of an example of a picture displayed on the display unit 3 in step S65.

For example, when the characteristic information shown in FIG. 12 is generated and transmitted, as FIG. 14 shows, a state in which text is being transmitted, an image 141 indicating the number of text items, and the titles of the text items are displayed.

The image 141 is, for example, an image stored in the storage unit 27 of the personal computer 1, and is displayed after being read based on the data-format representing information ("text/plain:2") included in the characteristic information. Definitely, the image 141 may be transmitted as the characteristic information from the PDA 11 and may be displayed after being downloaded from a predetermined server on a network through a communication unit, which is not shown. The titles shown in FIG. 14 are displayed based on the "patent document of A system" and "reference document of the system" included in the characteristic information.

Also, below the image 141, the new image A' (the image obtained by reducing the amount of data of the "IMAGE A" selected as transmitting data) generated in the PDA 11 is displayed. In the upper right part of the display unit 3, the message "RECEIVING DATA . . . " is displayed.

This enables the user to confirm that, after the wireless communication is established, the text data "patent document of A system", the text data "reference document of the system", and the image data shown by the Image A' will be transmitted from the PDA 11.

In other words, when the user operates the PDA 11 to select the above data items as transmitting data by himself or herself, the user can confirm whether or not the desired data will be transmitted to the personal computer 1, that is, a wrong operation has been performed.

When the exterior image of the PDA 11 is also posted as the characteristic information, the exterior image as shown in FIG. 9 may be displayed simultaneously with that shown in FIG. 14.

Referring back to FIG. 13, in step S66, the CPU 21 determines whether or not wireless communication has been established. If the CPU 21 has determined that the wireless communication has been established, it proceeds to step S67, and determines, by using the wireless communication, whether or not the transmitting data has been transmitted from the PDA 11.

The CPU 21 is on standby until it determines in step S67 that the transmitting data has been transmitted. If it has determined that the transmitting data has been transmitted, it proceeds to step S68 and acquires the transmitted data. The transmitting data received by the wireless communication unit 28 is acquired by the CPU 21, and is transferred to the RAM 23 and the storage unit 27, if required.

The CPU 21 displays the transmitting data on the display unit 3 in step S69.

Figure 15:
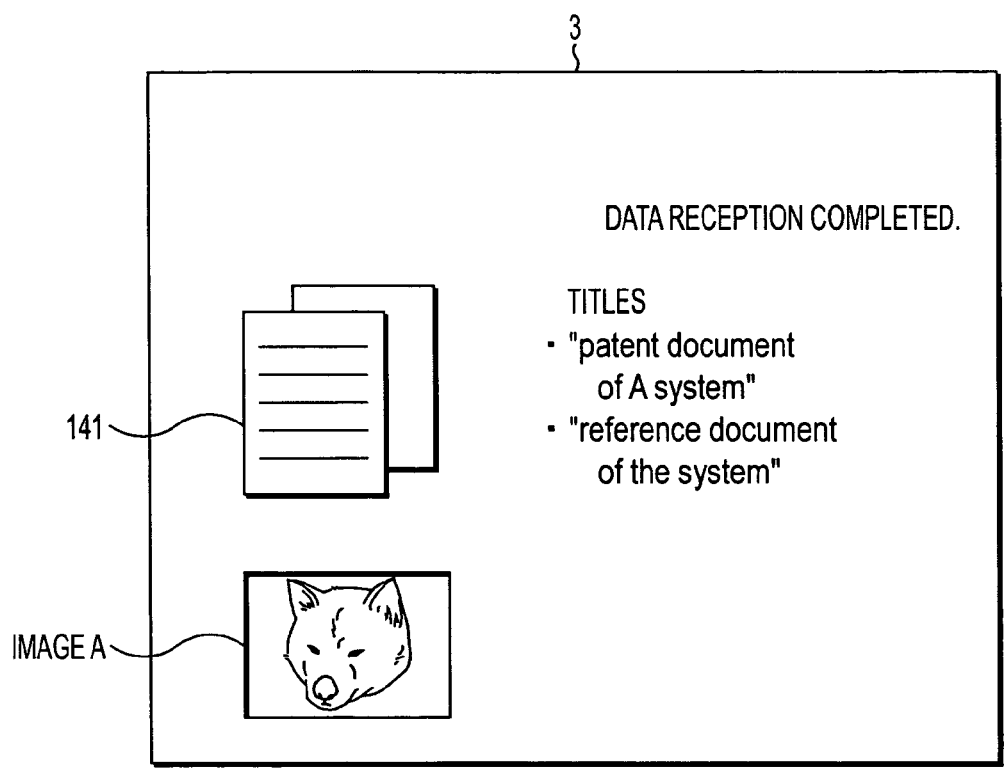
FIG. 15 is an illustration of an example of display by the personal computer.

FIG. 15 is an illustration of an example of a picture displayed on the display unit 3 in step S69.

As the above figure shows, instead of Image A', Image A, that is, the image (image whose amount of data is not reduced) selected by the user, is displayed. For example, by clicking on the Image A with a mouse or the like, the user can display the Image A in enlarged form.

In addition, since the text data has been acquired, the user can start a predetermined application by performing an operation such as clicking on the image 141, and can display the text data. In the upper right part of the display unit 3, the message "DATA RECEPTION COMPLETED" is displayed.

The above-described processing enables a user to confirm whether or not data which will be transmitted is data desired by the user, and the user can perform an operation in accordance with the data which will be transmitted. In other words, when it is confirmed that, due to a wrong operation, the data which will be transmitted is not the desired data, a predetermined operation may interrupt a wireless communication establishing process and a data transmitting process.

In the foregoing, based on characteristic information, text data and image data can be displayed. However, when data to be transmitted through wireless communication is music data, part of the data can be transmitted as characteristic information, and the part can be output by a device on the receiving side. This enables the user to wait for the music data to be transmitted, without getting tired. In this manner, in a range of reader/writer transmission speeds, various data items can be transmitted as characteristic information.

In addition, a case in which reader/writers provided in two apparatuses transfer various pieces of information by using electromagnetic induction to perform communication has been described. The communication is started such that both apparatuses are brought close to each other. For example, various pieces of information may be transferred by using IrDA or the like.

Either one apparatus may be provided with a camera, and the above various pieces of information may be transferred based on images captured by the camera. In this case, an image showing a so-called "cyber code™" obtained by coding information to be transferred is displayed by the other apparatus, which is not provided with a camera. In this manner, by using various methods, characteristic information, etc., can be transferred.

In the foregoing, in a wireless communication establishing process, among terminals detected by, for example, "Inquiry", with a terminal in which a Bluetooth address acquired through electromagnetic waves is set, "Page" is performed. However, based on the Bluetooth address acquired through electromagnetic waves, "Page" may be directly performed without performing "Inquiry".

Also, when the wireless communication unit is a module for Bluetooth, a Bluetooth address and information concerning service are transmitted as communication establishing information. However, for example, the PIN code required in first communication with a terminal by Bluetooth may be transmitted, and a Bluetooth device name which is set for each terminal may be transmitted.

For example, when the Bluetooth device name of the PDA 11 is provided through electromagnetic waves, the personal computer 1 performs the normal "Inquiry" and "Page" set forth in Bluetooth, and a Bluetooth device name acquiring process. Based on the Bluetooth device name already posted through electromagnetic waves, the personal computer 1 identifies the PDA 11 from among terminals which have posted Bluetooth device names, and performs subsequent communication.

In the foregoing, identification of another terminal in communication using Bluetooth is performed based on communication establishing information transmitted and received between the reader/writer 2 of the personal computer 1 and the reader/writer 12 of the PDA 11. However, even if the personal computer 1 and the PDA 11 are not provided with modules that use electromagnetic induction to perform close range wireless communication, by controlling the output power of radio waves from a wireless communication unit, a terminal on the other side in communication can be identified.

A communication system that identifies a terminal on the other party in communication by controlling the output power of radio waves output from a wireless communication unit is described below.

Figure 16:
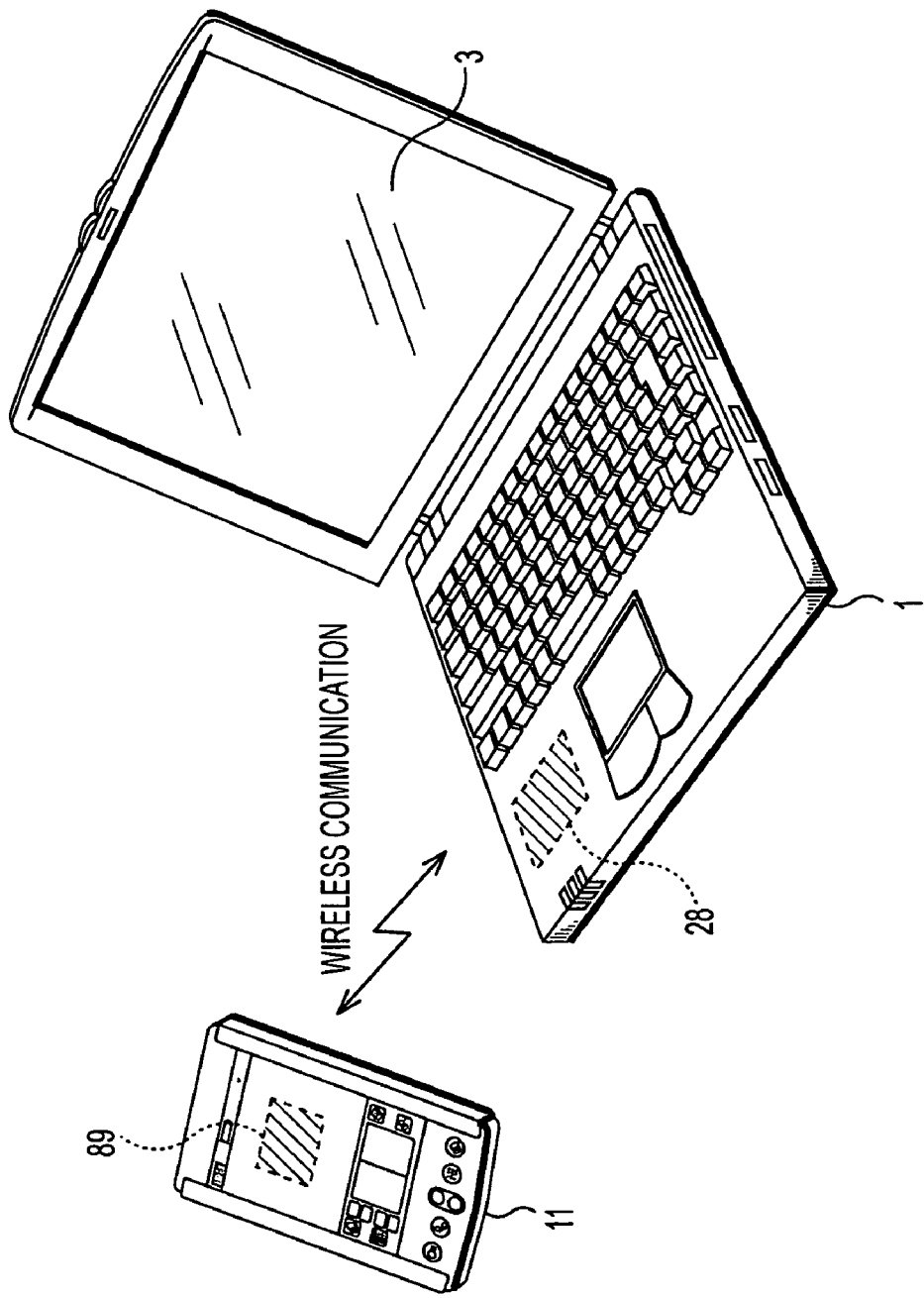
FIG. 16 is an illustration of an example of a communication system.

FIG. 16 is an illustration of an example of a communication system that identifies a terminal on the other party in communication by controlling the output power of radio waves.

For example, in the case of identifying another party in communication by Bluetooth and establishing communication with the party, the PDA 11 initially suppresses the output power of the wireless communication unit 89 (e.g., a Bluetooth module) to control radiated radio waves to arrive within, for example, a range of several centimeters. In such a state in which a very weal power mode with the output power of radio waves suppressed is set, the wireless communication unit 89 searches for terminals in the range (e.g., within a range of several centimeters) of arrival of the radio waves by repeatedly performing the "Inquiry".

When the PDA 11 is brought close to or disposed on the personal computer 1 by the user, and radio waves radiated by the wireless communication unit 89 are received by the wireless communication unit 28 (communication module identical in specification to the wireless communication unit 89) of the personal computer 1, the wireless communication unit 28 responds to the Inquiry. Thus, the wireless communication unit 89 performs the Inquiry and the Page (calling) to establish a communication link. The established communication link is effective within a very narrow range in which radio waves from the wireless communication unit 89, in which the very weak power mode is set, can reach.

Accordingly, after the wireless communication unit 89 temporarily breaks the communication link so that communication with the wireless communication unit 28 is possible, even if it is some distance away, and changes its power mode from the very weak power mode to a normal power mode, establishes a communication line with the wireless communication unit 28 again based on already acquired information (information acquired by the Inquiry and Page in a close distance).

The re-established communication link is effective in a range of few score meters in which radio waves can reach, similarly to normal Bluetooth communication, and enables Bluetooth communication, even if the distance between the personal computer 1 and the PDA 11 is sufficiently large.

Even in the above case in which the PDA 11 is not provided with the PDA 11, by controlling the output voltage of a wireless communication unit, only bringing the PDA 11 close to the personal computer 1 by the user can establish Bluetooth communication between these terminals.

In other words, even if there is a plurality of Bluetooth-communicatable apparatuses around the PDA 11, the personal computer 1 is identified as a terminal of another party in communication, and communication can be established.

In addition, when communication in the very weak power mode is established, an exterior image of an apparatus that starts communication or an image showing data to be transferred, as described above, is transmitted and received, and is displayed by both apparatuses, whereby, the user can confirm beforehand processing (e.g., processing performed when normal power mode communication is established) performed between the apparatuses, between which communication is established.

When the power mode of the wireless communication unit 89 can be seamlessly switched, the set power mode may be switched from the very weak power mode to the normal power mode without temporarily breaking the communication link established when the very weak power mode is set.

Figure 17:
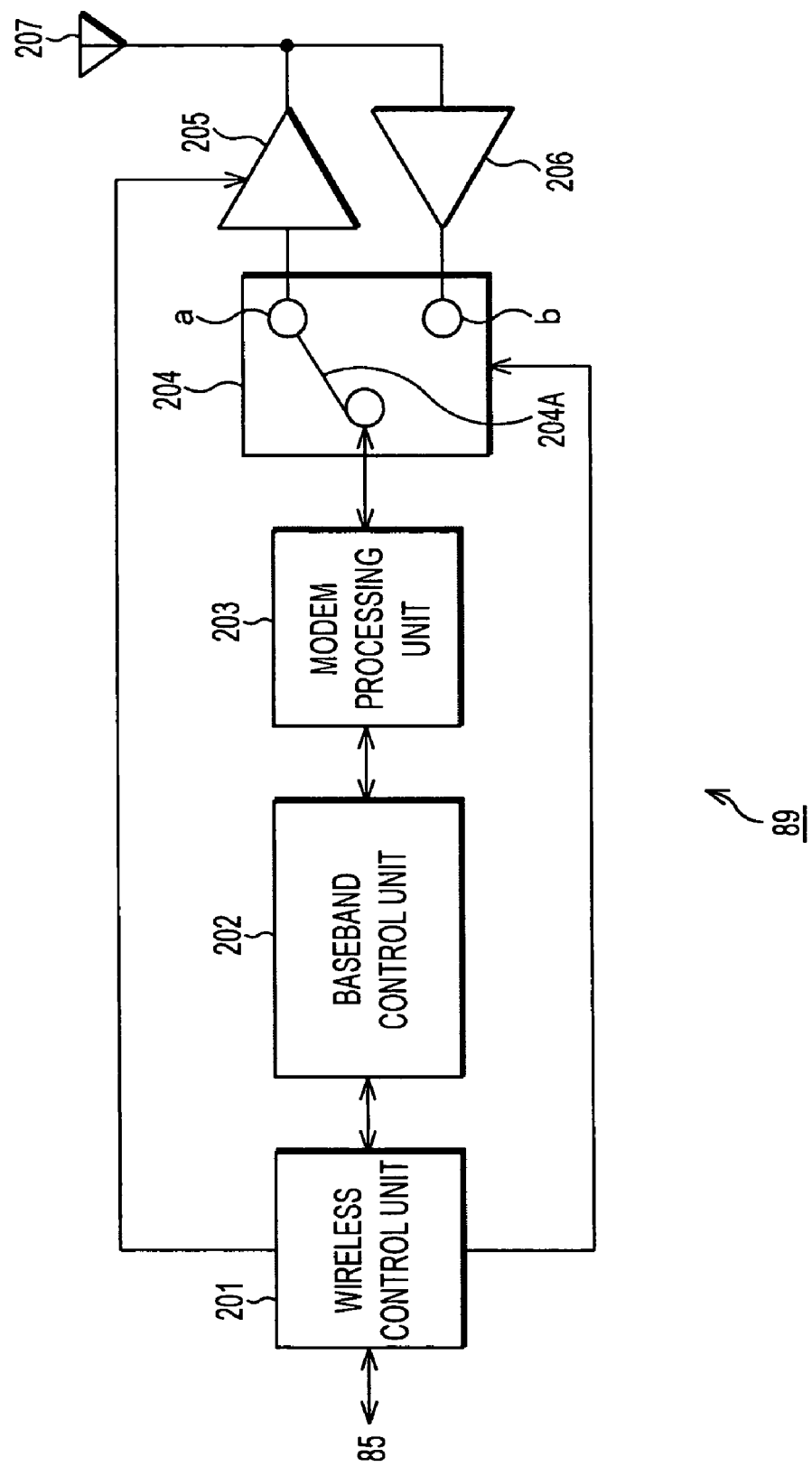
FIG. 17 is a block diagram showing an example of the wireless communication unit in FIG. 16.

FIG. 17 is a block diagram showing a detailed example of the wireless communication unit 89 in FIG. 16.

The wireless communication unit 89 is formed of a Bluetooth module or a wireless LAN module.

When a wireless control unit 201 controls a changeover switch 204 to transmit information from the wireless communication unit 89 to an external terminal, it connects a switch 204A to an a-side contact. Alternately, when it receives information transmitted from the external terminal, the switch 204A is connected to a b-side contact.

In addition, under the control of the CPU 81 through the input/output interface 85 (FIG. 4), the wireless control unit 201 controls the gain of a power amplifier 205 to control a reachable range (output power) of radio waves radiated from an antenna 207.

Specifically, when being instructed to set the very weak power mode by the CPU 81, the wireless control unit 201 controls the power amplifier 205 so that the reachable range of the radio waves radiated from the antenna 207 can narrow. Alternately, when a terminal of another party in communication can be identified, and the wireless control unit 201 is instructed to switch from the very weak power mode to the normal power mode, it controls the gain of the power amplifier 205 so that the reachable range of output radio waves can expand.

A baseband control unit 202 controls a baseband signal among transmitted and received signals. A modem processor 203 performs GFSK modulation processing and hopping-frequency-based spread spectrum processing on an output from the baseband control unit 202, and outputs the obtained signal from the antenna 207 through the power amplifier 205. Also, the modem processor 203 performs spread spectrum processing and GFSK demodulation processing on an output from an LNA (Low Noise Amplifier) 206, and outputs the obtained signal to the baseband control unit 202.

The configuration of the wireless communication unit 28 provided in the personal computer 1 is similar to that of the wireless communication unit 89 in FIG. 17. Accordingly, a description of the wireless communication unit 28 is omitted.

As described above, in the communication system shown in FIG. 16, reader/writers are not provided in the personal computer 1 and the PDA 11.

Figure 18:
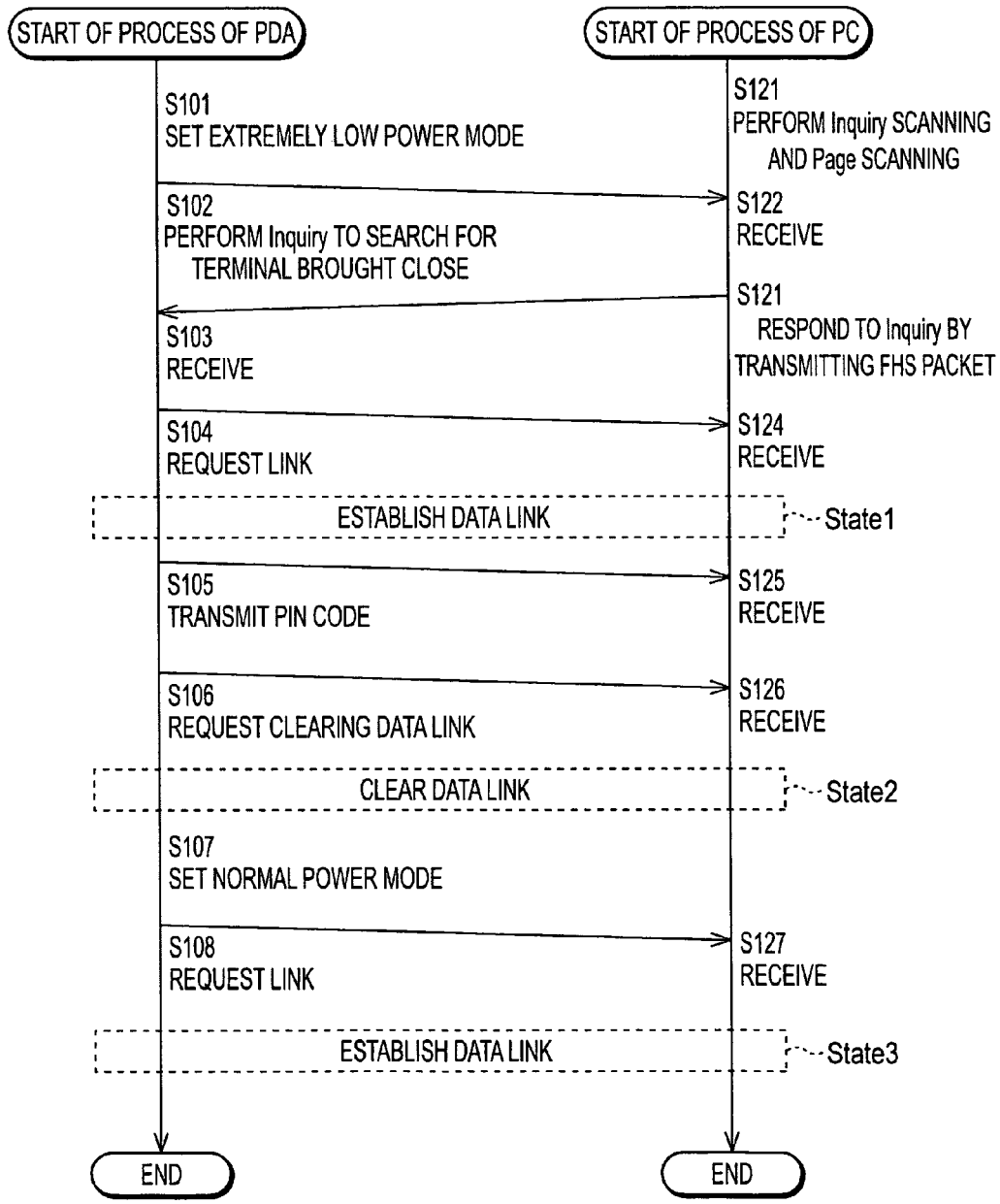
FIG. 18 is a flowchart illustrating an operation of the communication system in FIG. 16.

Next, the operation of the communication system in FIG. 16 is described with reference to the flowchart in FIG. 18. FIG. 18 illustrates a process in the case of identifying another party in Bluetooth communication and establishing communication.

For example, when being instructed to start Bluetooth communication by the user, the wireless communication unit 89 of the PDA 11 starts under the control of the CPU 81, and sets a very weak power mode as a power mode for itself in step S101. Also, the wireless communication unit 89 proceeds to step S102, and searches for a terminal, which is brought close, by repeatedly executing the Inquiry.

In the Inquiry executed in step S102, IQ packets (Inquiry packets) are repeatedly broadcast in a range of, for example, several centimeters from the antenna 207 since the very weak power mode is set to suppress the reachable range of radio waves.

At the same time, in step S121, the wireless communication unit 28 of the personal computer 1 is set in a state of repeatedly executing Inquiry scanning and Page scanning, and is on standby until another terminal requests the Inquiry and Page.

When the PDA 11 is brought close to the personal computer 1, and the wireless communication unit 28 of the personal computer 1 is within a reachable range of radio waves from the wireless communication unit 89 of the PDA 11, the IQ packets broadcast from the wireless communication unit 89 are received by the wireless communication unit 28 in step S122.

When the wireless communication unit 28 receives the IQ packets broadcast from the wireless communication unit 89, it proceeds to step S123 in order to respond to the IQ packets, and transmits an FHS packet to the wireless communication unit 89. The FHS packet includes, as (Bluetooth slave) attribute information of the personal computer 1, information representing a Bluetooth address and a Bluetooth clock.

When the FHS packet transmitted from the wireless communication unit 28 is received in step S103, the PDA 11 proceeds to step S104, and the wireless communication unit 89 requests the wireless communication unit 28 to link.

Specifically, when an ID packet is transmitted from the wireless communication unit 89 to the wireless communication unit 28, and an ID packet identical to the transmitted ID packet is sent back from the wireless communication unit 28 to the wireless communication unit 89, the FHS packet, which includes the Bluetooth address and Bluetooth clock of the wireless communication unit 89, is transmitted from the wireless communication unit 89 to the wireless communication unit 28.

When the FHS packet transmitted from the wireless communication unit 89 is received by the wireless communication unit 28 in step S124, synchronization in frequency domain (frequency hopping pattern) and time domain (time slots) is established between the wireless communication unit 89 and the wireless communication unit 28, a state (State 1) with a data link (communication link) established is activated.

For example, when a Bluetooth data link is established between the wireless communication unit 28 and the wireless communication unit 89 for the first time, in step S105, the wireless communication unit 89 transmits a PIN (Personal Identification Number) code to the wireless communication unit 28, and both authenticate each other.

The PIN code transmitted from the wireless communication unit 89 is received by the wireless communication unit 28 in step S125. After that, based on the PIN code, random numbers, etc., various link keys are set between the wireless communication unit 89 and the wireless communication unit 28.

Transmission and reception of the PIN code may be performed after the PIN code is encrypted by using a public key provided to the wireless communication unit 89. In other words, in this case, the wireless communication unit 28 manages by itself a secret key corresponding to the public key provided to the wireless communication unit 89. This can increase security, and greatly ensures that Bluetooth communication can be executed only between the personal computer 1 and the PDA 11.

The thus established communication link is effective within a range of several centimeters in which radio waves from the wireless communication unit 89, in which the very weak power mode is set, can reach. Thus, in step S106, the wireless communication unit 89 requests the wireless communication unit 28 to temporarily break the data link so that communication with the wireless communication unit 28 is possible, even if the wireless communication unit 89 is, to some extent, positioned away. At this time, information acquired through processing that has been performed, such as the Bluetooth address of the wireless communication unit 28 and the PIN code, are stored in the wireless communication unit 89.

Similarly to the wireless communication unit 89, the wireless communication unit 28, which receives the above request in step S126, stores the already acquired information, such as the Bluetooth address of the wireless communication unit 89 and the PIN code, and breaks the data link (State 2).

In step S107, under the control of the CPU 101, the wireless communication unit 89 sets the power mode of the output power to the normal power mode so as to establish a data link with the wireless communication unit 28 again. This allows Bluetooth radio waves from the wireless communication unit 89 to reach up to a range of, for example, few score meters.

Proceeding to step S108, based on information stored just before breaking the data link, the wireless communication unit 89 identifies the personal computer 1 as the terminal of the other party in communication, and requests the wireless communication unit 28 to link.

This request is received by the wireless communication unit 28 in step S127 and setting is performed in each terminal, whereby a state in which a data link is established between the wireless communication unit 89 and the wireless communication unit 28, that is, a state in which radio waves from the wireless communication unit 89, in which the normal power mode is set, can reach, for example, a state enabling Bluetooth communication within a range of few score meters is activated (State 3).

The communication system in FIG. 16 which identifies a terminal, which is brought close, as a terminal of another party in communication, as described above, is applied to the communication system in FIG. 1, whereby even if reader/writers are not provided, by simply bringing the PDA 11 close to the personal computer 1, the user can start communication between both terminals and can transmit and receive the above-described characteristic information between both terminals, which are brought close to each other.

In this case, when communication based on the very weak power mode is established, an exterior image is transmitted and received as characteristic information, and exterior images indicating apparatuses between which communication is initiated are displayed.

Next, a process of the communication system in FIG. 16 in which, when communication based on the very weak power mode is established, an exterior image as characteristic information is transmitted and received and the image is presented to the user is described with reference to the flowchart in FIG. 19.

In this example, when the communication based on the very weak power mode is established, a prepared exterior image of the personal computer 1 can be transmitted from the personal computer 1 to the PDA 11.

Processing in steps S141 to S145 by the PDA 11 and processing in steps S161 to S165 are similar to that in steps S101 to S105 and that in steps S121 to S125, respectively.

Specifically, the very weak power mode establishes a data link in which communication is possible within a range of, for example, few score centimeters, and the PIN code transmitted from the wireless communication unit 89 of the PDA 11 is received by the wireless communication unit 28 of the personal computer 1.

When receiving the PIN code, in step S166, the wireless communication unit 28 transmits the prepared exterior image of the personal computer 1 to the wireless communication unit 89.

In step S146, the exterior image transmitted from the wireless communication unit 28 is received by the wireless communication unit 89 and is stored in the storage unit 88 or the like in the PDA 11.

In step S147, the wireless communication unit 89 requests the wireless communication unit 28 to break the data link based on the very weak power mode. After the data is temporarily broken, the wireless communication unit 89 proceeds to step S148 and sets the normal power mode.

In step S149, the CPU 81 of the PDA 11 controls the display unit 86 to display the exterior image of the personal computer 1 based on the stored image data. This enables the user to confirm beforehand a terminal of another party in communication with which a data link based on the normal power mode is to be established.

For example, in step S150, when the user requests a link with the personal computer 1, whose exterior is displayed on the procedure selecting unit 86, the process proceeds to S151, and the wireless communication unit 89 request the wireless communication unit 28 to link based on the normal power mode.

When the request is received by the wireless communication unit 28, the data link based on the normal power mode is established (State 3).

As described above, based on data transmitted when a data link based on the very weak power mode is established, an exterior image of a terminal is displayed, whereby it is greatly ensured that communication with a terminal of another party in communication which is desired by the user can be established.

Although, in the foregoing, when communication based on the very weak power mode is established, an exterior image is transmitted as information representing an apparatus of another party in communication, not only it, but also various pieces of characteristic information, such as the name of the apparatus of the other party, may be transmitted and presented to the user.

In addition, by transmitting audio information concerning the apparatus of the other party in communication, and outputting audio guidance based on the information, even if a display unit is not provided in an apparatus which receives the audio information, information concerning an apparatus to be linked can be presented to the user beforehand.

The above-described consecutive processing can be executed by hardware, but can be executed by software.

In the case of using software to execute the consecutive processing, programs constituting the software are installed from a network or recording media into a computer built in dedicated hardware, or one that can execute various functions after various programs are installed therein, for example, a multipurpose computer or the like.

As shown in FIG. 2, the recording media is formed of package media includes a magnetic disk 30 (including a floppy disk), an optical disk 31 (including a CD-ROM (Compact Disk-Read Only Memory) and a DVD (Digital Versatile Disk)), a magneto-optical disk 32 (including an MD (trademark) (Mini-Disk)), and a semiconductor memory 33, which are distributed for providing users with programs, separately from an apparatus itself, and in which programs are recorded, and includes the ROM 22 and the storage unit 27, in which programs are recorded.

In this specification, steps constituting a program recorded on a recording medium include, not only processing time-sequentially performed in accordance with order given, but also processing which is executed in parallel or separately even if it is not time-sequentially performed.

In addition, in this specification, the system represents the entire apparatus constituted by a plurality of apparatuses.

INDUSTRIAL APPLICABILITY

As described above, according to the present invention, a user can suitably confirm details of an operation performed by the user.

The invention claimed is:

1. An information processing terminal comprising:
   first wireless communication means for performing short-range wireless communication with an information processing apparatus; and
   second wireless communication means for performing long-range wireless communication with said information processing apparatus;
   wherein said first wireless communication means transmits, to said information processing apparatus, through said short-range wireless communication, first terminal-characteristic information which represents characteristics of said information processing terminal and which at least includes an image showing the exterior of said information processing terminal that the information processing apparatus depicts while establishing the long-range wireless communication, and communication establishing information for establishing said long-range wireless communication with said information processing apparatus, which is information of a wireless communication address for establishing a new, long range wireless communication; and
   said second wireless communication means establishes said long-range wireless communication with said information processing apparatus based on said communication establishing information,
   wherein once said long-range wireless communication has been established, when said terminal is moved beyond a predetermined distance from said information processing apparatus, said long-range communication is capable of being performed.

2. An information-processing terminal according to claim 1, further comprising generating means for generating the data-characteristic information when the predetermined data to be transmitted through said long-range wireless communication is selected.

3. An information processing terminal according to claim 1, wherein, in a case in which said second wireless communication means establishes said long-range wireless communication:
   when the first terminal-characteristic information is transmitted to said information processing apparatus, second terminal-characteristic information having an amount of data larger than that of the first terminal-characteristic information is transmitted to said information processing apparatus through said long-range wireless communication; and
   when the data-characteristic information is transmitted to said information processing apparatus, the predetermined data is transmitted to said information processing apparatus through said long-range wireless communication.

4. An information processing method comprising the steps of:
   performing short range wireless communication with an information processing apparatus;
   performing long-range wireless communication with said information processing apparatus;
   transmitting, to said information processing apparatus, through said short-range wireless communication, terminal-characteristic information which represents characteristics of an information processing terminal and which at least includes an image showing the exterior of said information processing terminal that the information processing apparatus depicts while establishing the long-range wireless communication, and communication establishing information for establishing said long-range wireless communication with said information processing apparatus, which is information of a wireless communication address for establishing a new, long range wireless communication; and
   establishing said long-range wireless communication with said information processing apparatus based on said communication establishing information,
   wherein once said long-range wireless communication has been established, when said terminal is moved beyond a predetermined distance from said information processing apparatus, said long-range communication is capable of being performed.

5. A recording medium storing computer-executable program instructions which, when executed by a computer, perform a method comprising:
   controlling short-range wireless communication performed with an information processing apparatus;
   controlling long-range wireless communication performed with said information processing apparatus;

controlling transmission through said short-range wireless communication of terminal-characteristic information which represents an information processing terminal and which at least includes an image showing the exterior of said information processing terminal that the information processing apparatus depicts while establishing the long-range wireless communication, and communication establishing information for establishing said long-range wireless communication with said information processing apparatus, which is information of a wireless communication address for establishing a new, long range wireless communication; and controlling the establishment of said long-range wireless communication with said information processing apparatus based on said communication establishing information;

wherein once said long-range wireless communication has been established, when said terminal is moved beyond a predetermined distance from said information processing apparatus, said long-range communication is capable of being performed.

6. An information processing apparatus according comprising:

first wireless communications means for performing short-range wireless communication with an information processing terminal;

second wireless communication means for performing long-range wireless communication with said information processing terminal; and output means for outputting predetermined information acquired from said information processing terminal through said short-range wireless communication performed by said first wireless communication means;

wherein said first wireless communication means acquires, from said information processing terminal, through said short-range wireless communication, first terminal-characteristic information which represents characteristics of said information processing terminal and which at least includes an image showing the exterior of said information processing terminal that the information processing apparatus depicts while establishing the long-range wireless communication, and communication establishing information for establishing said long-range wireless communication with said information processing terminal, which is information of a wireless communication address for establishing new, long range wireless communication;

said second wireless communication means establishes said long-range wireless communication with said information processing terminal based on said communication establishing information acquired by said first wireless communication means, wherein once said long-range wireless communication has been established, when said terminal is moved beyond a predetermined distance from said information processing apparatus, said long-range communication is capable of being performed; and said output means outputs said first terminal-characteristic information or data-characteristic information acquired by said first wireless communications means.

7. An information processing apparatus according to claim 6, wherein:

when second terminal-characteristic information having an amount of data larger than that of the first terminal-characteristic information is transmitted through said long-range wireless communication from said information processing terminal, said second wireless communication means acquires the second terminal-characteristic information; and when the second terminal-characteristic information is acquired by said second wireless communication means, said output means outputs the second terminal-characteristic information instead of the first terminal-characteristic information.

8. An information processing apparatus according to claim 6, wherein:

when the predetermined data is transmitted from said information processing terminal, said second wireless communication means acquires the predetermined data; and when the predetermined data is acquired by said wireless communication means, said output means outputs the predetermined data.

9. An information processing method comprising the steps of:

performing short-range wireless communication with an information processing terminal;

performing long-range wireless communication with said information processing terminal;

outputting predetermined information acquired from said information processing terminal through the said short-range wireless communication;

acquiring, from said information processing terminal, through said short-range wireless communication, terminal-characteristic information which represents characteristics of said information processing terminal and which at least includes an image showing the exterior of said information processing terminal that the information processing apparatus depicts while establishing the long-range wireless communication, and communication establishing information for establishing said long-range wireless communication, which is information of a wireless communication address for establishing a new, long range wireless communication;

establishing said long-range wireless communication with said information processing terminal based on the acquired communication establishing information, wherein once said long-range wireless communication has been established, when said terminal is moved beyond a predetermined distance from said information processing apparatus, said long-range communication is capable of being performed; and outputting the acquired terminal-characteristic information or data-characteristic information.

10. An information processing terminal according to claim 1, wherein said short-range wireless communication is any one of wireless communication performed through electromagnetic waves and wireless communication based on a very weak power mode.

* * * * *

UNITED STATES PATENT AND TRADEMARK OFFICE
CERTIFICATE OF CORRECTION

PATENT NO. : 7,505,768 B2
APPLICATION NO. : 10/494028
DATED : March 17, 2009
INVENTOR(S) : Yuji Ayatsuka It is certified that error appears in the above-identified patent and that said Letters Patent is hereby corrected as shown below:

In claim 2, column 22, line 12, "information-processing" should read --information processing--.

In claim 4, column 22, line 35, "short range" should read --short-range--.

*In claim 6, column 23, lines 22-23, "apparatus according comprising:" should read --apparatus comprising:--.

*In claim 6, column 23, line 24, "communications" should read --communication--.

In claim 6, column 23, line 60, "communications" should read --communication--.

Signed and Sealed this

Thirtieth Day of June, 2009

JOHN DOLL
*Acting Director of the United States Patent and Trademark Office*